United States Patent [19]

Cherba

[11] 4,244,034
[45] Jan. 6, 1981

[54] PROGRAMMABLE DUAL STACK RELAY LADDER LINE SOLVER AND PROGRAMMING PANEL THEREFOR

[75] Inventor: David M. Cherba, Pontiac, Mich.

[73] Assignee: Westinghouse Electric Corp., Pittsburgh, Pa.

[21] Appl. No.: 2,159

[22] Filed: Jan. 9, 1979

[51] Int. Cl.³ .................... G06F 9/00; G06F 15/46
[52] U.S. Cl. .................................. 364/900; 364/104; 364/120
[58] Field of Search ... 364/104, 107, 120, 200 MS File, 364/900 MS File

[56] References Cited

U.S. PATENT DOCUMENTS

| 3,686,639 | 8/1972 | Fletcher et al. | 364/900 |
|---|---|---|---|
| 3,950,736 | 4/1976 | Dix et al. | 364/900 |
| 4,021,783 | 5/1977 | Highberger | 364/900 |

OTHER PUBLICATIONS

"Cl. 888L Programmable Controller Program Box"-pp. 1-21-Jan. 1975-Square D Co., Milwaukee, Wi.
"IPC^tm Industrial Programmable Controller Memory Loader/Monitor (L/M)"-Jan. 1973-pp. 1-28, Industrial Solid State Controls, Inc., York, Pa. 17405.
"PLC Programming and Operation"-Allen-Bradley Co. Bulletin, No. 1774.
"Modicon 184/384 Manual"-Modicon Corp.-(pp. 31-65, A2-A5)-Jun. 1977.
"484 Manual"-Gould, Modicon Div.-(pp. III-III 30, IV 1, A1-A20), Mar. 1978.
"Logitrol Control"-pp. 1-30-Jan. 1977, General Electric Co., General Purpose Control Dept., Bloomington, Il., 61701.

Primary Examiner—Joseph F. Ruggiero
Attorney, Agent, or Firm—M. J. Moran

[57] ABSTRACT

A programmable controller of the type used to solve relay ladder diagrams is taught. The programmable controller includes a memory into which is placed a digital representation of the rungs of the ladder diagram. The dispositions of various switches and coils are periodically sampled by other portions of the programmable controller and stored in other memory locations. At appropriate times between sampling intervals, the various memory information are combined and provided to a relay line solver which comprises part of the programmable controller. The relay line solver updates the status of the relay ladder diagram and restores the updated information in a memory. This memory is used during the sampling intervals to change the status of output devices. The programming portion of the programmable controller includes UP, OPEN and RETURN keys which may be manipulated by an operator in an appropriate manner for entering the ladder diagram initially into the programmable controller memory or for updating or changing the status of the various rungs of the ladder diagram. The entry keys are such that contact interconnection information is entered into the memory at the same time and by the same keys that are utilized to enter the contact information. This means that no separate memory words are required for contact interconnection information in the appropriate memory of the programmable controller. Notwithstanding the aforementioned, very complex rungs of ladder diagrams may be entered using the three previously-mentioned keys.

43 Claims, 25 Drawing Figures

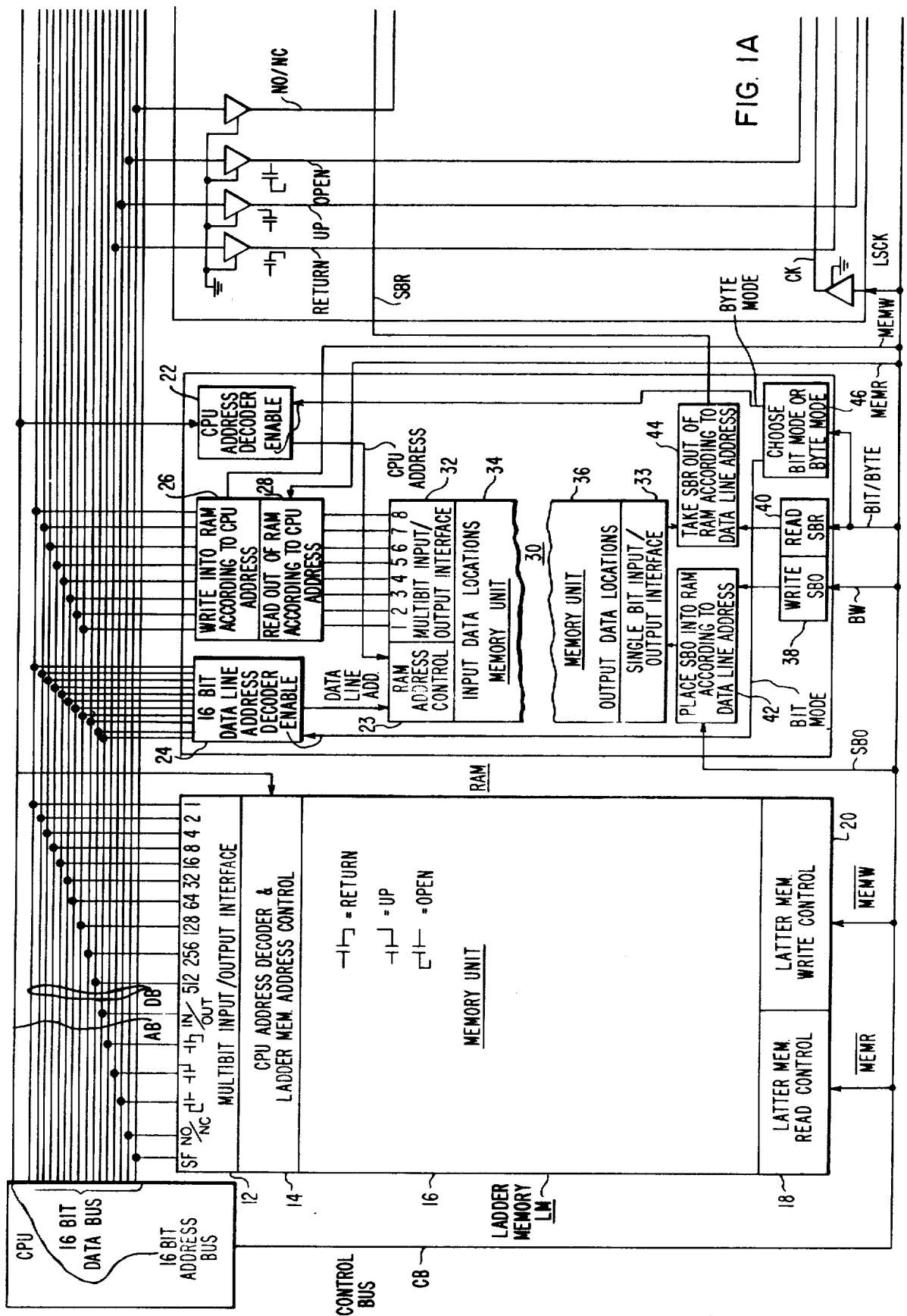

FIG. 10

| DATA DESIGNATION | SF | NO/NC | OPEN | UP | RETURN | IN/OUT | 512 | 256 | 128 | 64 | 32 | 16 | 8 | 4 | 2 | 1 | LADDER MEM. SEQUENTIAL WORD |
|---|---|---|---|---|---|---|---|---|---|---|---|---|---|---|---|---|---|
| IN 001 | 0 | 0 | | 0 | | | 0 | 0 | 0 | 0 | 0 | 0 | 0 | 0 | 0 | | WORD 001 |
| IN 006 | | — | — | — | — | | | | | | | | | | — | — | WORD 002 |
| IN 002 | | | | | — | — | | | | | | | — | | — | — | WORD 003 |
| IN 009 | | | — | | | — | | | | | | | | — | — | — | WORD 004 |
| OUT 003 | | | | | — | | | | | | | | — | — | | — | WORD 005 |
| OUT 009 | | | — | — | | | | | | | | | | — | — | | WORD 006 |
| OUT 001 | | | | | — | | | | | | | | | | | — | WORD 007 |
| OUT 013 | | | | — | | — | | | | | | | — | — | — | | WORD 008 |
| IN 006 | | | — | — | — | | | | | | | | | — | — | — | WORD 009 |
| IN 007 | | | | | — | — | | | | | | | — | — | | — | WORD 010 |
| IN 011 | | | | | | — | | | | | | | — | — | — | — | WORD 011 |
| IN 018 | | | | — | — | — | | | | | | — | — | | | — | WORD 012 |
| OUT 015 | | | — | | | — | | | | | | | — | — | — | | WORD 013 |
| OUT 012 | | | | — | | — | | | | | | | — | — | — | — | WORD 014 |
| IN 015 | | | — | — | — | | | | | | | — | — | | — | — | WORD 015 |
| IN 003 | | | | | | | | | | | | — | | — | — | — | WORD 016 |
| OUT 013 | | | | | — | — | | | | | — | — | | | — | — | WORD 017 |
| OUT 081 | | | | — | *— | | | | | | — | | | | | — | WORD 018 |
| OUT 012 { | | | | | | | | | | | | | | | | | |
| IN 013 | | — | — | | | | | | | | | | | | | — | WORD 019 |
| OUT 081 | | | | | | | | | | | | | | | | | |
| TIMER INFO { IN 021 | | | | | | | | | | | | | | | | | |
| TMR ACC | | | | — | — | — | | | | | | | | | | — | |
| TMR-PSET | | | | | | | | | | | | | | | | | |
| OUT 87 | | — | — | — | — | — | | | | | | — | | — | | — | |

*PROG. PANEL INSERTED

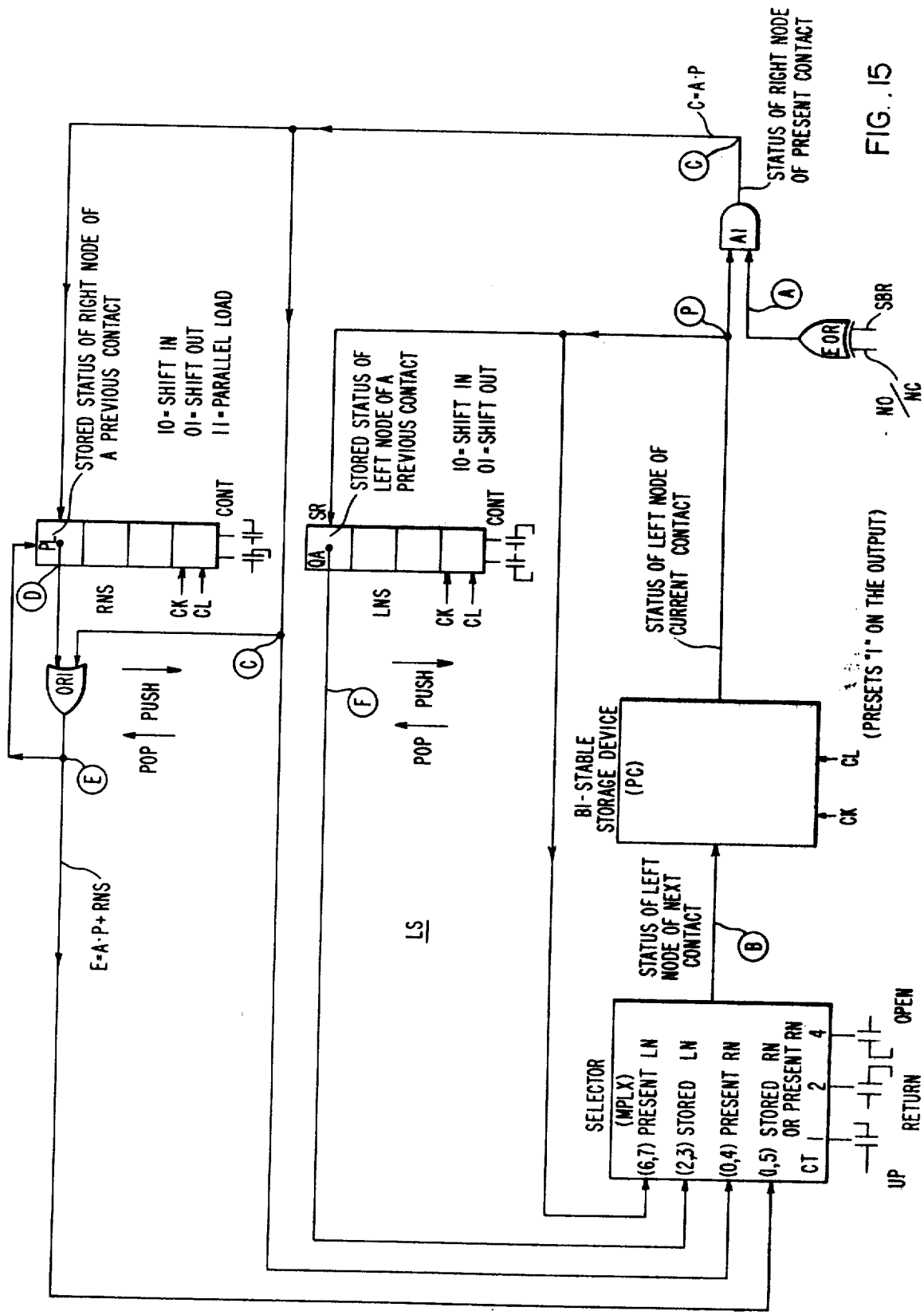

4,244,034

PROGRAMMABLE DUAL STACK RELAY LADDER LINE SOLVER AND PROGRAMMING PANEL THEREFOR

CROSS-REFERENCE TO RELATED APPLICATIONS

The subject matter of this invention is related to concurrently filed and copending applications Ser. No. 002,141, entitled "Programmable Dual Stack Relay Ladder Diagram Line Solver And Programming Panel Therefor With Prompter" and Ser. No. 002,145, entitled "Programmable Dual Stack Relay Ladder Diagram Line Solver With Shift Register".

BACKGROUND OF THE INVENTION

The subject matter of this invention relates generally to programmable controllers, and more specifically to contact interconnection indicia on the programming panel thereof and the cooperation of the controller memory and line solver of the controller with the programming panel.

Relay logic ladders include rungs of interconnected switches, relay contacts and output devices (such as relay coils) disposed in rows between two conductors of a power supply. The ladders work by using the principles of relay logic for controlling electromechanical devices. According to art which predates the advent of relay line solver technology, relays, switches and other devices of the logic ladders (which are hard-wired, relatively large electromechanical devices) are strung together between the conductors of a power supply. The various switches and contacts of the relay logic ladder are in various states of conduction or non-conduction depending upon the disposition of mechanical devices, such as floats, or depending upon the disposition of output devices, such as relay coils, to which they are interlinked electrically or mechanically. In the event that appropriate contacts or switches are in a closed state in a given rung of the ladder, the output device, usually a relay coil, controlled by the rung will be actuated. The actuation may cause certain phenomena external or internal to the relay ladder to occur.

With the advent of computer technology, the relay ladder diagram, which is a graphical representation of the relay ladder, is simulated within a programmable controller. This eliminates the bulky, relatively expensive relays, saves space, and generally reduces the need for expensive hard-wired interconnections. The programmable portion of the controller gives the controller operator or logic system designer flexibility. According to still other art, the various interconnections between contacts, switches and output devices in a relay rung are simulated with a diode matrix, as is taught in U.S. Pat. No. 3,950,736, issued Apr. 13, 1976 to Dix et al. Essentially, this requires the use of a diode matrix which can be programmed by moving diodes into and out of the matrix in a predetermined fashion. One disadvantage of this is the relatively cumbersome arrangement of the diode matrix and the level of dexterity and skill required in using or programming it. In still other art concerned with a computer controlled ladder diagram solver (sometimes called a line solver), a programming panel is used for initially programming or for subsequently changing the status of various memories contained therein.

As the latter prior art developed, it is suggested that certain characteristics began to emerge as important. They are: complexity of the problem to be solved; memory efficiency; and operator skill. Complexity of the problem to be solved is associated primarily with the arrangement of the interconnections between elements in a rung of a ladder diagram and, to a lesser extent, with the number of elements in a rung of a ladder diagram. Memory efficiency is associated with the number of memory bits or locations required for complete entry of a rung of a ladder diagram into the programmable line solver. Operator skill is associated with the operator's capability for converting the symbols of a rung of a ladder into manipulations of the programming panel (a program loader) of the programmable controller with maximized speed and minimized potential for error. An examination of the prior art shows that the attainment of all three important features in a single programmable controller is difficult. Consequently, the prior art seems to branch in two directions—the choice of which depends upon which of the aforementioned important functions is to be optimized at the expense of the others. In one case, optimization tends towards flexibility—that is, the programmable controller is designed and constructed so that relatively complex ladder diagrams can be entered into the programmable controller for solution thereby at the expense of memory efficiency. One of the problems associated with memory lies in the fact that in most of the prior art of the aforementioned kind, separate memory words must be utilized for entering the elements and for entering the interconnections between elements in a complex ladder diagram. Corollary to this, is that additional operator manipulations of the programming panel be all made by the operator to place the additional interconnection information into the memory. Examples of the preceding may be found in U.S. Pat. No. 4,021,783, issued May 3, 1977 to G. C. Highberger and entitled "PROGRAMMABLE CONTROLLER". A further example is found in the Allen-Bradley Company Bulletin No. 1774, entitled "PLC PROGRAMMING AND OPERATION". Still a further example is found in a bulletin from Industrial Solid State Controls, Inc. dated January 1973 entitled "IPC TM INDUSTRIAL PROGRAMMABLE CONTROLLER MEMORY LOADER/MONITOR (L/M)". Still another example is found in U.S. Pat. No. 3,686,639 issued Aug. 26, 1972 to Fletcher et al and entitled "DIGITAL COMPUTER-INDUSTRIAL CONTROLLER SYSTEM AND APPARATUS". Another example is found in a SQUARE D COMPANY bulletin dated Jan. 2, 1975, identified by the following: "Cl.8881 PROGRAMMABLE CONTROLLER PROGRAM BOX—APPLICATION OF TYPE PR-2 PROGRAM BOX". Another example is found in apparatus described in a manual provided by the MODICON Company, entitled, "MODICON 184/384 MANUAL" June 1977 (for example pp 31-65 and A-2 through A-5). In the other case, the trend appears to be towards memory efficiency at the expense of flexibility. This type of controller or processor tends to be limited as to the number of elements (contacts, timers, etc.) which can be entered, the number of possible circuit combinations which can be utilized and/or the total length or size of the ladder rung. Furthermore, apparatus has been found in which some contact and associated interconnection information may be entered into one word of memory in a limited case with one key manipulation of a single key of the program panel. Such may be found in a General Electric Company descriptive bulletin dated January 1977, entitled "LOGITROL CONTROL". However, in no case discovered can an entire ladder diagram rung be entered in this way i.e. with all types of interconnections entered by use of a contact entry device or key. It would be advantageous, therefore, if a programmable controller could be found which was suitable for solving relatively complex ladder diagrams, but which nevertheless utilized a minimum number of a memory locations for storing the ladder diagram therein and which required a relatively low level of operator skill.

SUMMARY OF THE INVENTION

In accordance with the invention, a programmable controller for solving a ladder diagram is taught in which a relatively complex ladder diagram is entered into the memory of the controller by way of a programming panel, but where a relatively small number of memory locations are necessary for holding or storing the ladder diagram as entered. An advantageous way of accomplishing the foregoing is to provide a contact entry format in which the interconnection between contacts is contained in the various contact words so that as an entire rung of a ladder diagram is reconstructed in the memory thereof, all of the contact interconnection information is contained in the words which describe the contacts, there being no separate words required for interconnection information. As a result of this greater speed of execution is obtained in the processing of the ladder diagram within the programmable controller. To accomplish this, a memory means is provided for having the contacts of the ladder diagram stored therein in a representative form. Programming means is interconnected with the memory for entering the contacts into the memory. The programming means includes a first entry means which is usable for establishing in the memory means a condition precedent for representing a left node to left node interconnection between a subject contact and a yet unentered contact. Furthermore, second entry means is provided which is usable for two purposes, the first of which is for establishing in the memory means a condition precedent for representing a right node to right node interconnection between a subject contact and a yet unentered contact and which is usable for a second purpose of representing in the memory means the interconnection of the left node of the next entered contact with the left node of a previously entered contact for which a condition precedent for representing a left node to left node interconnection had been established. In addition, a third entry means is provided for representing in the memory means the interconnection of the right node of a subject contact with the right node of the previously entered contact for which a condition precedent for representing a right node to right node interconnection had been established. Finally, a ladder diagram solving means set up to use the data as entered in the format entered is provided for solving the ladder diagram and for providing an output related to the solution.

BRIEF DESCRIPTION OF THE DRAWINGS

For a better understanding of the invention, reference may be had to the preferred embodiments thereof, shown in the accompanying drawings, in which:

FIG. 1A through FIG. 1D show a programmable controller system partially in schematic form and partially in block diagram form;

FIG. 10 shows a graphical depiction of a ladder memory in which the ladder relay diagram of FIG. 2 has been completely entered in the ladder memory of FIG. 1A in proper sequence for solution;

FIG. 15 shows a simplified version of the line solver of FIG. 1B.

DESCRIPTION OF THE PREFERRED EMBODIMENTS

Figure 1B:
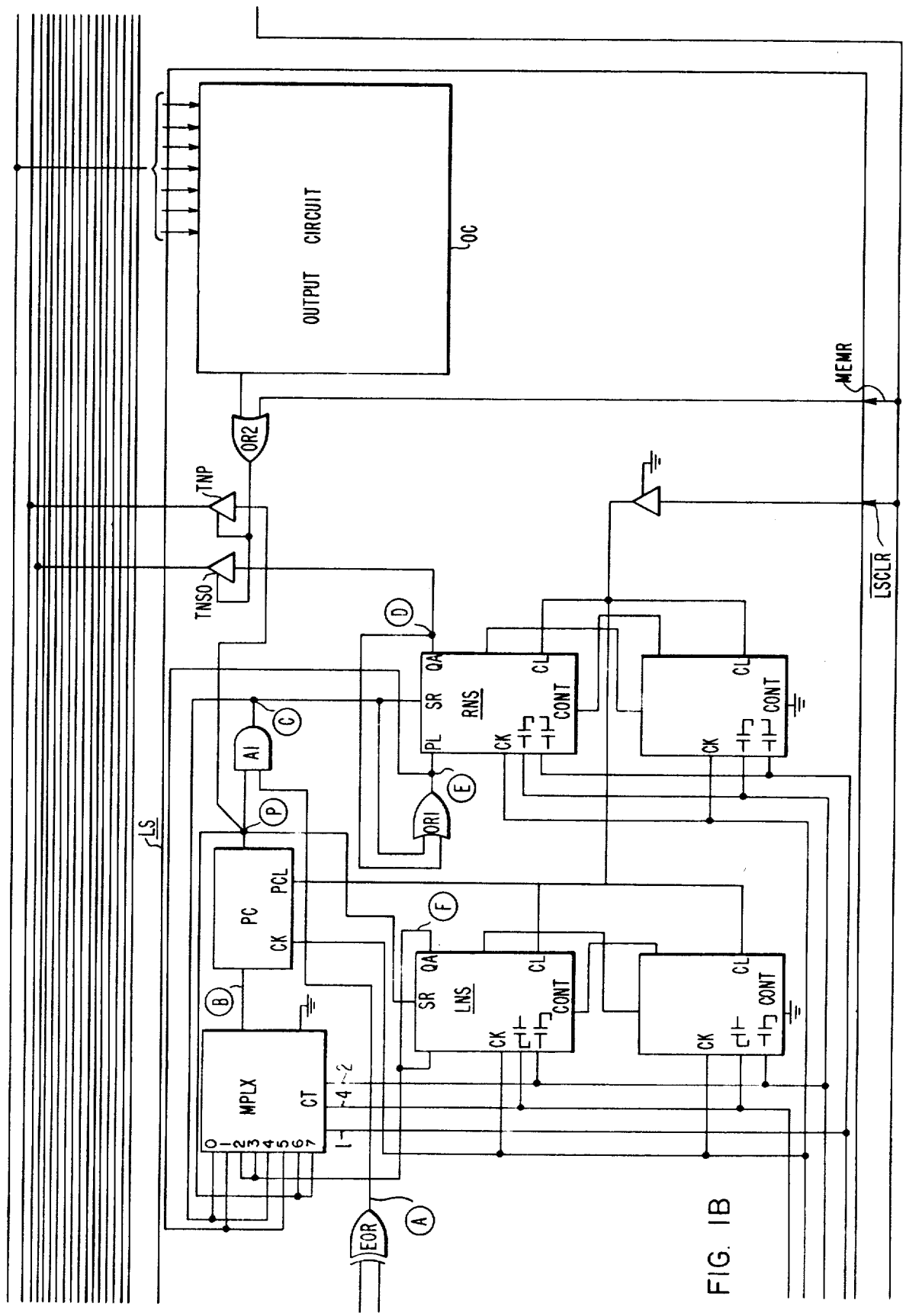

Referring now to the drawings, and FIGS. 1A through 1D in particular, a depiction of a programmable controller PC is shown. In a preferred embodiment of the invention, the programmable controller PC may be utilized for solving ladder relay circuits or diagrams, such as of the kind to be shown hereinafter in FIG. 2. In the preferred embodiment of the invention, the programmable controller PC may include a line solver LS, a ladder memory LM, a random access memory RAM, a programming panel PP with programming panel interface PPI, an input-output interface IOI, an input-output buffer IOB, a sampler distributor SD, appropriate input-output cards and power supplies and a central processing unit CPU. As the name implies, the central processing unit CPU is utilized to centrally control the other units in the programmable controller PC. Although the central processing unit CPU may include a software program control computer, a software computer program does not represent a part of the present invention. The central processing unit may have three sets of control lines. First, there is a single bit control bus CB, which provides various coded control signals to other portions of the programmable controller PC. Second, there is a sixteen bit data bus DB, which is utilized to transfer data into and out of the programmable controller PC or between portions of the programmable controller PC. The data may be thusly transferred on parallel lines in words of sixteen bits or less. In some instances, control information is passed along the sixteen bit address bus AB, as will be described more completely hereinafter. Third, there is a sixteen bit address bus AB shown here conveniently as one line, it being understood that the one line represents sixteen parallel lines. The sixteen bit address bus AB is utilized to transfer address information to or between portions of the programmable controller PC. The address information may be thusly transferred in words having as many as sixteen parallel bits.

Another of the units of the programmable controller PC is a ladder memory LM. The ladder memory LM is interconnected with the control bus CB, the data bus DB and the address bus AB of the central processing unit CPU. The ladder memory LM is utilized to store information concerning the contacts, coils, counters, timers, etc. of rungs of a ladder diagram. The ladder memory LM is distinguished by its capability for storing the latter identified information in the sequence in which each rung of the relay ladder is to be solved.

Another unit of the programmable controller PC is a random access memory unit RAM. The random access memory unit RAM is interconnected with the control bus CB, the address bus AB and the data bus DB of the central processing unit CPU. The random access memory unit RAM is distinguished by its capability for storing the periodically sampled contact and coil status of the actual relays and coils, for example, represented by a ladder diagram.

The actual input and output devices for the programmable controller PC are interconnected with the random access memory unit RAM of the programmable controller PC by way of conductors of the sixteen bit data bus DB. An input-output interface IOI is interconnected with the appropriate conductors of the data bus DB for data transfer and with appropriate conductors of the address bus AB for address or control. The input-output interface IOI may be viewed as a control device in which the information of the data bus DB is controlled by information on the address bus AB. The input-output interface IOI is interconnected with an input-output buffer module IOB. The input-output buffer module IOB is utilized for electrical voltage and impedance matching. The input-output buffer IOB in turn is connected to a sampler distributor SD, the main function of which is the gathering of data from input card racks ICR for transfer to other portions of the programmable controller PC or the distribution of data to output card racks OCR for control of coils, lamps and the like.

Figure 1C:
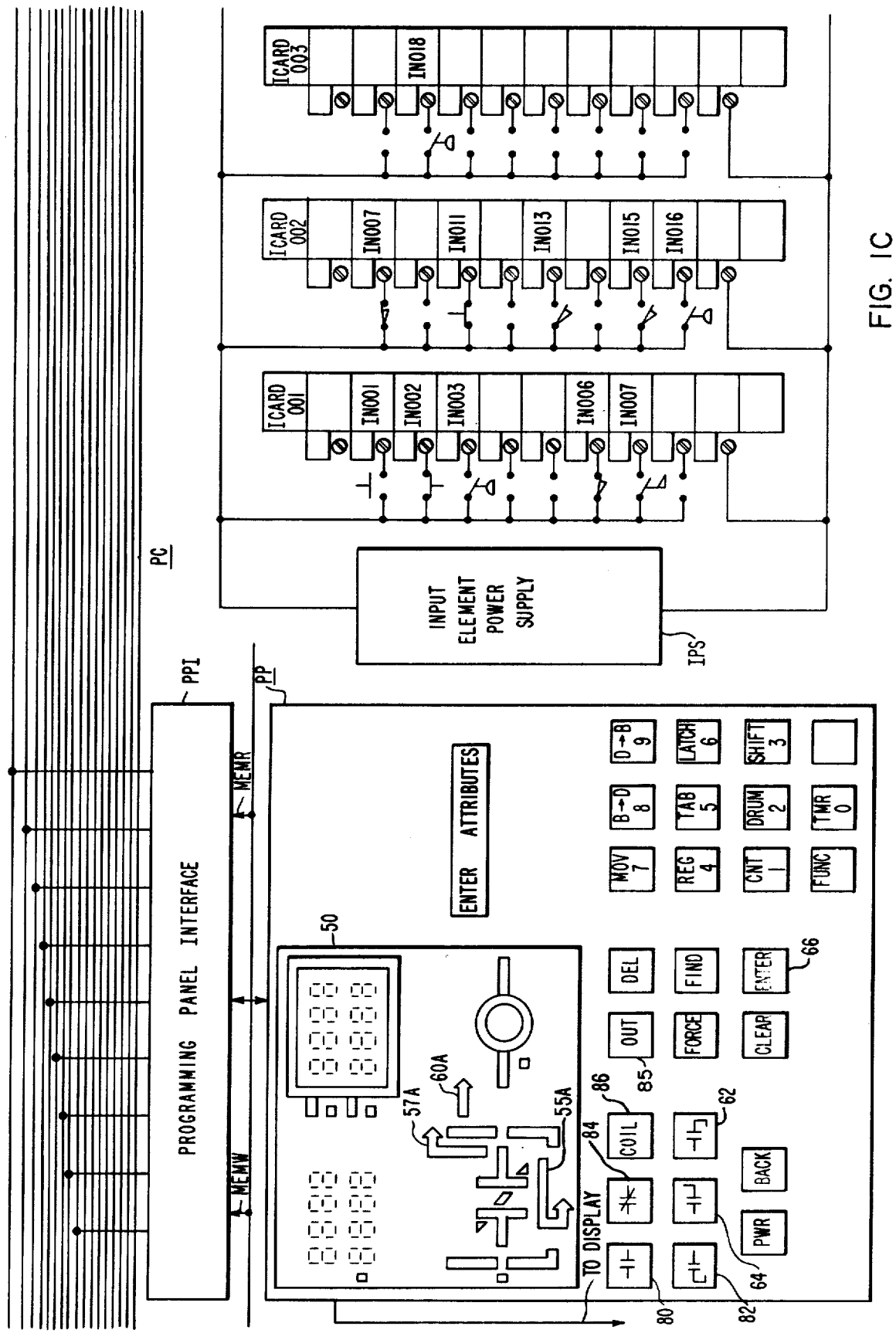
Figure 1D:
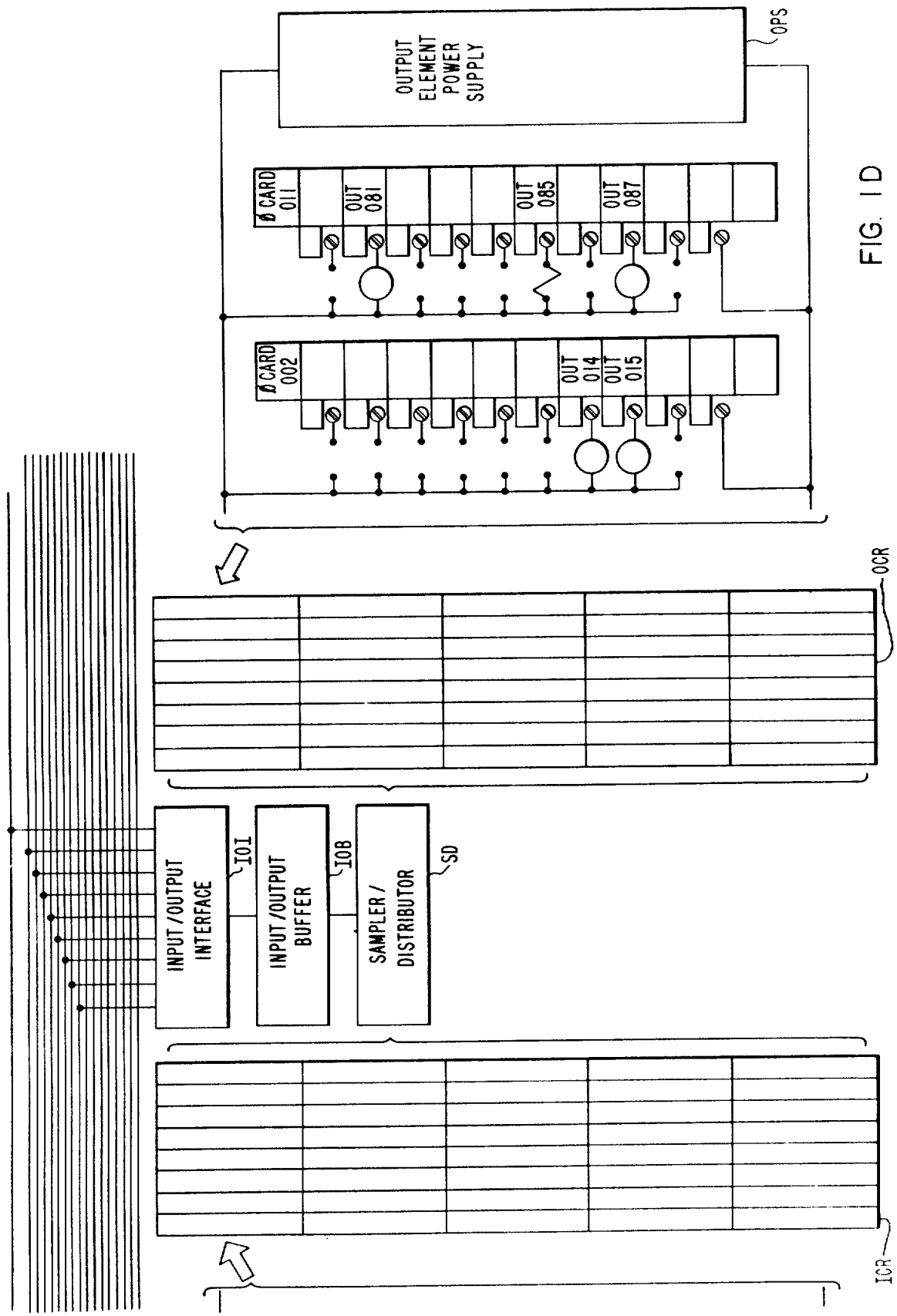

For purposes of simplicity of illustration, an illustrative input card rack ICR is shown to the left of the sampler distributor SD in FIG. 1D, and an illustrative output card rack OCR is shown to the right of the sampler distributor SD in FIG. 1D. The input card rack ICR and the output card rack OCR are shown schematically as comprising five rows of eight cards per row for purposes of illustration. To the left of the input card rack ICR is schematically shown three input cards, arbitrarily identified as ICARD 001, ICARD 002 and ICARD 003. These three cards each control eight inputs, some of which are shown interconnected with various types of contacts, such as normally open switches, normally closed switches, limit switches and the like; and some of which are shown in a non-utilized disposition. An input element power supply IPS is shown for energizing the various portions of the various input cards in accordance with the status of the switches, contacts or the like associated with the inputs of the cards. Cards ICARD 001, ICARD 002 and ICARD 003 may be visualized as the top three cards to the left in the input card rack ICR. Shown to the right of the schematic representation of the output card rack OCR of FIG. 1D are two representative output cards, output card OCARD 002 and output card OCARD 011. These cards are interconnected with an output element power supply OPS so that various coils, lamps, etc. interconnected with the output cards may be energized in response to information supplied to the output card rack OCR by the sampler distributor SD.

Forming part of the programmable controller PC, though detachable therefrom in a preferred embodiment of the invention, is a programming panel PP and a suitable programming panel interface PPI. The programming panel interface PPI is interconnected with appropriate conductors in the sixteen bit data bus DB and with appropriate conductors in the sixteen bit address bus AB for passing data from the programming panel PP to various portions of the programmable controller PC and back in appropriate circumstances. The address bus AB is utilized to provide address or control information to the programming panel interface PPI for directing the data between the sixteen bit data bus DB and the programming panel PP. The programming panel interface PPi also provides an electrical impedance matching function where necessary. Essentially, the programming panel PP provides apparatus for allowing an operator to program the programmable controller PC by loading data concerning the status of the various rungs of a ladder diagram into the ladder memory LM in an appropriate predetermined order for a quick, efficient solution of the ladder diagram at an appropriate time. The programming panel PP provides the additional feature of prompting the operator as to which of the various elements of a rung of a complex ladder diagram is to be next entered in sequence after a previous element has been entered. The programming panel PP is also interconnected with the control bus CB for being controlled by the central processing unit CPU in appropriate circumstances.

The programmable controller PC also includes a line solver LS. The line solver LS performs the function of solving a ladder diagram. It is essentially a hardwired microprocessor or computer which periodically accepts data from the ladder memory LM and the random access memory RAM for a step-by-step sequential solution of one contact or device of a rung of a ladder diagram at a time. This is done in accordance with the provision of various clock, clear and control pulses supplied by the central processing unit CPU. At appropriate times, the solution of a ladder diagram rung is provided at an output or outputs of the line solver LS in accordance with control information contained on the control bus CB of the central processing unit CPU and address information contained on the address bus AB of the central processing unit CPU. The solution, in a preferred embodiment of the invention, is supplied to the random access memory RAM for updating the random access memory RAM.

A generalized over-view of the operation of the programmable controller PC follows. An operator, having a ladder diagram to be solved, enters the various input devices thereof, such as contacts, and output devices thereof, such as coils, into the ladder memory LM of the programmable controller PC in an appropriate sequence for solution. A display 50 on the programming panel PP may indicate the type of element entered (e.g. a contact), its appropriate identification number and the direction in which to search for the next element to enter. Likewise, a remote readout or display (not shown) may also be provided to display the growing contact arrangement as constructed and entered by the operator. The properly sequenced data concerning the input and output devices of the ladder diagram are entered into the ladder memory LM in encoded digital form. The actual devices represented schematically by the ladder diagram exist in the real world, although they are not interconnected one to the other in the form shown in a ladder diagram. The programmable controller PC interconnects them; however, it is necessary to periodically sample the status of the various switches, relay contact, coils etc. to determine if they are ON or OFF, closed or open, as the case may be. This information is sampled by the sampler distributor SD, passed through the input-output buffer IOB and the input-output interface IOI to certain conductors on the sixteen bit data bus DB and thence to the memory unit of the random access memory RAM to update the random access memory RAM. A solution of the ladder diagram may be begun by the line solver LS. The central processing unit CPU calls data out of the ladder memory LM one element at a time in coded form and supplies that information by way of the data bus DB, for example, to the line solver LS. Information contained in the ladder memory LM is also supplied to the random access memory RAM, where an appropriate address location is called for. In the appropriate address location, the actual status of the input device or output device, as the case may be, has been stored during a previous sampling interval. That information is then supplied to the line solver LS in parallel with the information from the ladder memory LM. The line solver LS, at an appropriate time, as indicated by the central processing unit CPU, solves an element, which for purposes of illustration, may be called a contact but is not limited thereto. Then, in sequence, the next element is supplied to the line solver LS for further solution. Similarly, information concerning the actual status of the element (e.g. a contact or output device) is provided in parallel to the line solver LS from the random access memory RAM. Once an entire rung of the relay ladder diagram has been solved, the status of the output becomes determined, that is the rung has been solved. This information, the solution, is then fed back to the random access memory RAM from the line solver LS, where it updates the random access memory RAM. At this time, the random access memory RAM may be sampled in accordance with directions from the central processing unit CPU and information may be transmitted along the sixteen bit data bus DB to the input-output interface IOI, and thence to the input-output buffer IOB, and thence to the sampler distributor SD, for distribution to the output card rack OCR and appropriate cards therein. This has the net effect of changing the status of output devices in accordance with the solution information provided thereto. It can therefore be seen that an operator loads the ladder diagram into the programmable controller PC at an initial time. Thereafter, the programmable controller PC through the direction of the central processing unit CPU samples the input card rack ICR periodically. The frequency of sampling may be many times per second. Meanwhile, the line solver takes information from the ladder memory LM and from the periodically updated random access memory RAM and solves the ladder diagram one contact at a time in accordance with the gathered information. Later information is provided to the output card rack OCR for an updating operation.

The central processing unit CPU of the programmable controller PC interconnects with all of the other elements of the programmable controller PC. The central processing unit CPU performs a number of important functions for the programmable controller PC. It performs the important function of data transfer by way of its sixteen bit data bus DB. It performs the important function of addressing by way of its sixteen bit address bus AB; and it performs the important function of control by way of its control bus CB. In addition, two other functions are performed by the central processing unit CPU—firstly, in some instances, address information for the image random access memory RAM is supplied by way of the data bus DB. The specific utilization will be described hereinafter in more detail. Secondly, data for the image RAM is supplied, in some instances, by way of the control bus CB of the central processing unit CPU. In the specific case of the programmable controller PC, at least seven kinds of information are provided on the control bus CB. The first six kinds of information are control information, and the seventh type of information is data information. The first kind of control signal provided by the control bus is the memory read function, designated MEMR. This information is provided to the ladder memory LM, the random access memory RAM, and the program panel interface PPI. Essentially, this signal commands the apparatus to which it is supplied to to take information which is in the apparatus and put that information on the sixteen bit data bus, one bit per line, according to the address which is present on the sixteen bit address bus AB of the central processing unit. Similarly, there is a memory write signal MEMW. It is supplied to the same elements; and it provides the opposite function from the memory read signal MEMR. Specifically, the memory write signal MEMW commands the apparatus to which it is supplied to take information which is on the sixteen bit data bus into the apparatus and place it into a location defined by the address present on the address bus AB at that time. The third type of control signal provided by the central processing unit is a clear signal designated LSCLR. This signal is provided to the line solver for initiation of the solution of a rung of the ladder diagram. Its function will be described in more detail hereinafter. The fourth type of signal provided by the central processing unit is a clock function signal designated by the symbol LSCK. The clock function is used with respect to the line solver to provide the actuation pulse for solving a contact. Consequently, for the line solver to solve a rung of a ladder diagram having a given number of contacts and coils or other devices therein, as many clock pulses are needed to complete the solution as there are devices. The fifth kind of control signal provided by the central processing unit is the signal which determines the format for reading data into and out of the image RAM. This signal is designated BIT/BYTE. The word BIT indicates data is to be transferred one bit at a time. The word BYTE indicates that data is to be transferred in multiple bits along parallel conductors. In the specific case of the present programmable controller PC, the makeup of the image RAM is such that the BIT mode, i.e., the presence of the BIT signal performs the additional function of alerting the RAM that a memory read function is to take place— that is, when the BIT mode is present, a single bit of data will be read out of the image RAM. This latter signal is designated SBR, which means single bit read. The last control function associated with the present programmable controller is the bit write signal, designated BW. This signal is essentially complementary to the bit portion of the BIT/BYTE signal—that is, the signal BW indicates that a single bit of information is to be written into the RAM memory. The line upon which this single bit is present is designated SBO. This line is interconnected with the control bus CB and is a part thereof. This line provides the previously mentioned data function associated with the control bus CB.

As was mentioned previously, a programmer will enter a ladder diagram, one element at a time, into the programmable controller PC. Typically, this is done by manipulating the keys of the program panel PP such that correct data about the ladder diagram is stored in the program panel interface PPI. This information is typically stored for the length of one ladder rung. The central processing unit is alerted to this; and at an appropriate time, unloads the program panel interface PPI into the ladder memory LM. This manipulation is controlled by way of the memory write MEMW and the memory read MEMR control signals and by addresses on the sixteen bit address bus AB. Information or data is taken out of the program panel interface PPI and directed towards addresses within the central programming unit CPU according to address information which precedes each cluster of data from the program panel interface PPI. The information is temporarily stored in the assigned addresses in the central programming unit CPU. The central programming unit CPU calls for information, both address and data, by utilizing the memory write signal MEMW at the program panel interface PPI and by actuating the program panel interface PPI with an address on the sixteen bit address bus AB. The information that is temporarily stored in the central programming unit CPU is then transferred to the ladder memory LM by actuating the memory read control signal MEMR and storing the information on the sixteen bit data bus DB as a function of a new address on the sixteen bit address bus AB. The information stored in the ladder memory LM is stored in clusters of sixteen bits. Said in another way, the ladder memory LM stores sixteen bit words. The words are stored in a predetermined dispostion for use in an eventual line solving operation. The predetermined disposition is fixed by the operator during manipulation of the keys on the programming panel PP. The sixteen bits in question are arranged in order from the least significant bit to the most significant bit as follows: first, there are eleven bits of word address. These address bits are not the same as the address provided by the central processing unit CPU for locations in the ladder memory LM. Rather, these eleven bits of address are stored as data in the ladder memory LM, along with other data, in a location therein which is fixed by the address on the sixteen bit address bus AB of the central processing unit CPU. The previously mentioned eleven bits of address are in digital form and identified as such—"1", "2", "4", "8", "16", "32", "64", "128", "256", "512", "IN/OUT". Depending upon the status of each of the locations associated with the foregoing words, a numerical address coded in digital form is provided. The function of the most significant digit, or the IN/OUT bit will be described hereinafter with respect to the random access memory RAM. The five most significant remaining bits of the ladder memory word comprise three contact interconnection sequence attribute identifiers, a contact status bit and a special function bit. The contact attributes are identified as RETURN (⊣⊢⊐), UP (⊣⊢⊐), and OPEN (⊢⊣⊢—). They are shown in their symbolic form in FIG. 1A. Their use will be described in more detail hereinafter with respect to the programming panel PP and the line solver LS. The contact status bit, identified by the symbol NO/NC, is used to identify whether a contact is normally opened or normally closed. If the contact is normally closed, the status is represented by a digital one. A special functions bit, designated by the reference symbol SF, is utilized to assist in indicating what type of apparatus is represented by the bit in question. As an example, a relay will have a digital zero in the special function bits; whereas an output coil will have a digital one in the special functions bit, and may incidentally have digital one's in other bits to help designate its status as a coil. The bit designated IN/OUT is utilized in a convenient way for segregating input devices, such as relays, from output devices, such as coils, in the RAM memory unit. It is not confined to that use, however, and it is correct to say that it is utilized to address a discrete part of the RAM memory.

The image RAM or random access memory RAM is a versatile memory which may be accessed in a random fashion to provide input information thereto or output information therefrom in either multi-bit or single bit words. The random access memory RAM may comprise a CPU address decoder 22 which is interconnected with the sixteen bit address bus AB of the central processing unit CPU. The address decoder 22 has an ENABLE terminal which is interconnected with the BYTE MODE output terminal of the decisional block 46. The input to the decisional block 46 is the previously described BIT/BYTE control signal from the control bus CB of the central processing unit CPU. When the BIT/BYTE signal is in a BYTE mode state, the BYTE mode terminal of the decision block 46 is energized, to thus enable the CPU address decoder 22. Decision block 46 performs the function of choosing whether the BIT mode or BYTE mode signal is present at the appropriate input terminal thereto and provides an output signal related to the absence or presence of said signal. The output of the CPU address decoder 22 is a CPU ADDRESS signal. This is provided to a RAM address control 23. The random access memory RAM also includes a sixteen bit data line address decoder 24. This decoder has as parallel inputs those twelve lines of the sixteen bit data bus DB which are interconnected with the twelve least significant bits of the sixteen bit words of the ladder memory unit, i.e., significant bits "1" through "IN/OUT", consecutively. The sixteen bit data line address decoder 24 has an ENABLE terminal, which is interconnected with the BIT MODE output terminal of the previously described decision apparatus 46. An output terminal of the sixteen bit data line address decoder 24 is a DATA LINE ADD (address) which is also supplied as an input to the RAM address control 23. Consequently, it can be seen that depending upon the status of the BIT/BYTE signal of the control bus CB, either the CPU ADDRESS DECODER 22 or the 16 BIT DATA LINE ADDRESS DECODER 24 is enabled, to thus provide either a CPU address or a data line address to the RAM address control 23. This means that the address to be utilized in the memory unit 30 of the ramdom access memory RAM will come from the sixteen bit address bus or from the sixteen bit data bus, depending upon the status of the BIt/BYTE signal. The RAM memory unit 30 may be divided conveniently into two sections. The first section is called INPUT DATA LOCATIONS 34; and the second section is called OUTPUT DATA LOCATIONS 36. These data locations each contain eight parallel bits, which are interconnected to a write-in device 26 or a readout device 28 for the image RAM. The write-in device 26 performs the function of writing into the RAM according to the CPU address or reading out of the RAM according to the CPU address. Consequently, any data which enters the RAM or leaves the RAM in eight-bit chunks from the sixteen bit data bus does so when the CPU address bus AB is utilized to provide an address signal for the RAM address control 23 portion of the memory unit 30. Whether the information enters the input data locations 34 or the output data locations 36 is primarily a function of the aforementioned eleventh bit, designated IN/OUT of the latter memory LM. The write unit 26 is actuated by the control signal MEMW. When this control signal is present, information from the first eight parallel lines of the sixteen bit data bus DB is loaded into the memory unit 30 according to an address on the CPU address decoder 22. On the other hand, if the control signal MEMR is present, the readout block 28 is actuated to take the eight parallel bits of data stored in the memory unit 30 out of the memory unit 30 and to place that data on eight appropriate lines in the sixteen bit data bus DB. The latter two arrangements are utilized to move large amounts of sampled data from the input cards ICR into the memory unit 30 periodically when the input cards ICR are sampled and to move large amounts of stored data out of the memory unit 30 when the output cards OCR are to be periodically updated. It can be seen, therefore, that the latter two functions represent bulk loading and unloading of the memory unit 30 for either sampling of cards interconnected with the data bus DB or for providing output signals to cards interconnected with the data bus, as the need arises. The versatility of the image random access memory RAM is such that data may be provided to the memory unit 30 in single bits rather than eight bit groups in appropriate circumstances. In a like manner, data may be removed in single serial bits rather than in eight-bit groups, if that is desired. To be more specific, a functional block 38, designated WRITE SBO is connected to receive the previously described control signal BW. Furthermore, a functional block designated READ SBR is interconnected to receive the previously described control signal BIT/BYTE. The output of functional block 40 is provided as a control input to a functional block 44 which performs the function of taking a single bit of data SBR out of a location of the memory unit 30 according to a data line address. In a like manner, the output of the WRITE SBO functional block 38 is provided to a functional block 42, which is utilized to perform the function of taking a single bit of data SBO from the control bus CB and placing it into the memory unit 30 in accordance with a data line address. Therefore, it can be seen that an input signal for functional block 44 comes from the memory unit 30 and an output signal is provided therefrom to the line solver LS. The output is designated SBR. Similarly, an input signal for the functional block 42 comes from the control bus CB and is designated the single bit output data signal SBO. An output from the functional block 42 is provided to the memory unit 30. To assist in the latter two single bit operations, a functional block entitled SINGLE BIT INPUT-OUTPUT INTERFACE 33 is provided. Therefore, it can be seen that if the bit write signal BW is on the control bus CB, a single bit of information SBO will be directed into an appropriate place in memory unit 30 in accordance with an address on the sixteen-bit data bus DB. On the other hand, if the BIT/BYTE signal on the control bus CB is in the BIT mode, then a single bit of data will be taken out of the memory unit 30 in accordance with an address on the sixteen-bit data line DB and utilized elsewhere. The address from the sixteen-bit data line DB which controls the previously described single bit locations in the memory unit 30 of the image random access memory RAM is defined by the eleven least significant bits of a word in the memory unit of the ladder memory LM. The four bits RETURN, UP, OPEN and NC of the previously described word of the latter memory LM are supplied along with the SBR signal to the line solver LS for utilization therein to solve a contact which is related to the latter sixteen-bit word. This will occur if the special function bit SF, as stored in the appropriate word of the ladder memory LM, is at a digital zero, which indicates no special function.

A synopsis of the loading and unloading of the memory unit 30 of the image random access memory RAM as those actions affect other portions of the programmable controller PC is follows: Periodically, during the operating cycle of the programmable controller PC, time is allocated for sampling the status of the input cards ICR, shown in FIGS. 1C and 1D. The sampled information or data is supplied in eight bit chunks to the image ramdom access memory RAM where it is stored for later utilization by the line solver LS. This data is later utilized by the line solver LS to determine whether a sampled contact is in its normal state, whether that be opened or closed, or in its non-normal state. During the actual line solving process, as information is sequentially read out of the ladder memory LM, a portion of that information is provided as an address to the image random access memory RAM, where one specific location therein is identified, by the address, for utilization. The information stored in the addressed location is taken out of the random access memory RAM on the SBR line and provided to the line solver LS along with other information from the ladder memory LM. This is done iteratively until an entire rung of the ladder diagram has been solved, in which case, the central processing unit CPU is alerted to read the solution from the line solver LS. The alert occurs when the special function bit SF of the sixteen-bit ladder memory word is a digital one. When this happens, the solution of the line solver LS is transferred by way of the sixteen-bit data bus DB to the central processing unit CPU, where it is converted to the SBO signal and routed to the control bus CB and appropriately loaded into the memory unit 30 of the random access memory RAM. The location chosen for the thusly loaded SBO solution information in the memory unit 30 is almost always in the output data portion 36 of the memory unit 30 and is specifically determined by the existing digital coding or address of the eleven least significant bits of the sixteen-bit data bus DB. This, it will be remembered, is the data which is utilized to determine entry location in the memory unit 30 of the random access memory RAM (see description of element 24). After all the rungs of the ladder diagram have been solved in this manner, a period of time in the operation cycle of the programmable controller PC is allocated for removing, in eight bit clusters, information from the OUTPUT DATA LOCATIONS 36 of the memory unit 30. This output data is provided to the sixteen-bit data bus DB and from there to the appropriate output cards OCR by way of the INPUT/OUTPUT INTERFACE IOI, the INPUT/OUTPUT BUFFER IOB and the SAMPLER DISTRIBUTOR SD. The status of the appropriate output cards OCR is thus changed to reflect the status of the recently solved rungs of the ladder diagram. The previously described steps are repeated often, thus maintaining the actual output devices represented by the ladder diagram in the appropriate states. As the status of the various input devices changes, the next cycle of operation of the programmable controller PC will reflect those changes, thus providing new outputs at the end of that cycle of operation for causing the output devices, such as the coils, the lamps and the like to once again change correspondingly if necessary. The operation of the INPUT DATA LOCATIONS 34 and the OUTPUT DATA LOCATIONS 36 in the memory unit 30 are non-limiting in the sense that occasionally input information is in fact stored in the output data location; and occasionally, output information is stored in the input data location in accordance with certain techniques of solution. As an example, a device identified in a ladder diagram as an output coil may in fact be an actuating coil for multiple contacts in other rungs of the ladder diagram and may have no real world counterpart portion of the output cards. In order for a simulated solution to occur, the status of this output device is determined in accordance with the previously described operation. The output information is stored in the output portion 36 of the memory unit 30. In the solution of subsequent rungs of the ladder diagram, it is at this specific location that the line solver will be directed to look to determine the status of the contacts which are normally considered input devices for other rungs of the ladder diagram which are to be solved by the line solver. In the preferred embodiment of the invention, no separate input location is set aside for this information, that means that input information is taken from an output location. The output coil in this situation may be referred to as a dummy coil—that is, it has no real world output counterpart; it merely represents the status of other contacts to be controlled thereby in the remaining portions of the ladder diagram. It follows, therefore, that there will be no real world input for these contacts as these contacts and coils are not used in the real world; they are used merely to change the status of other rungs in the ladder diagram.

Figure 2:
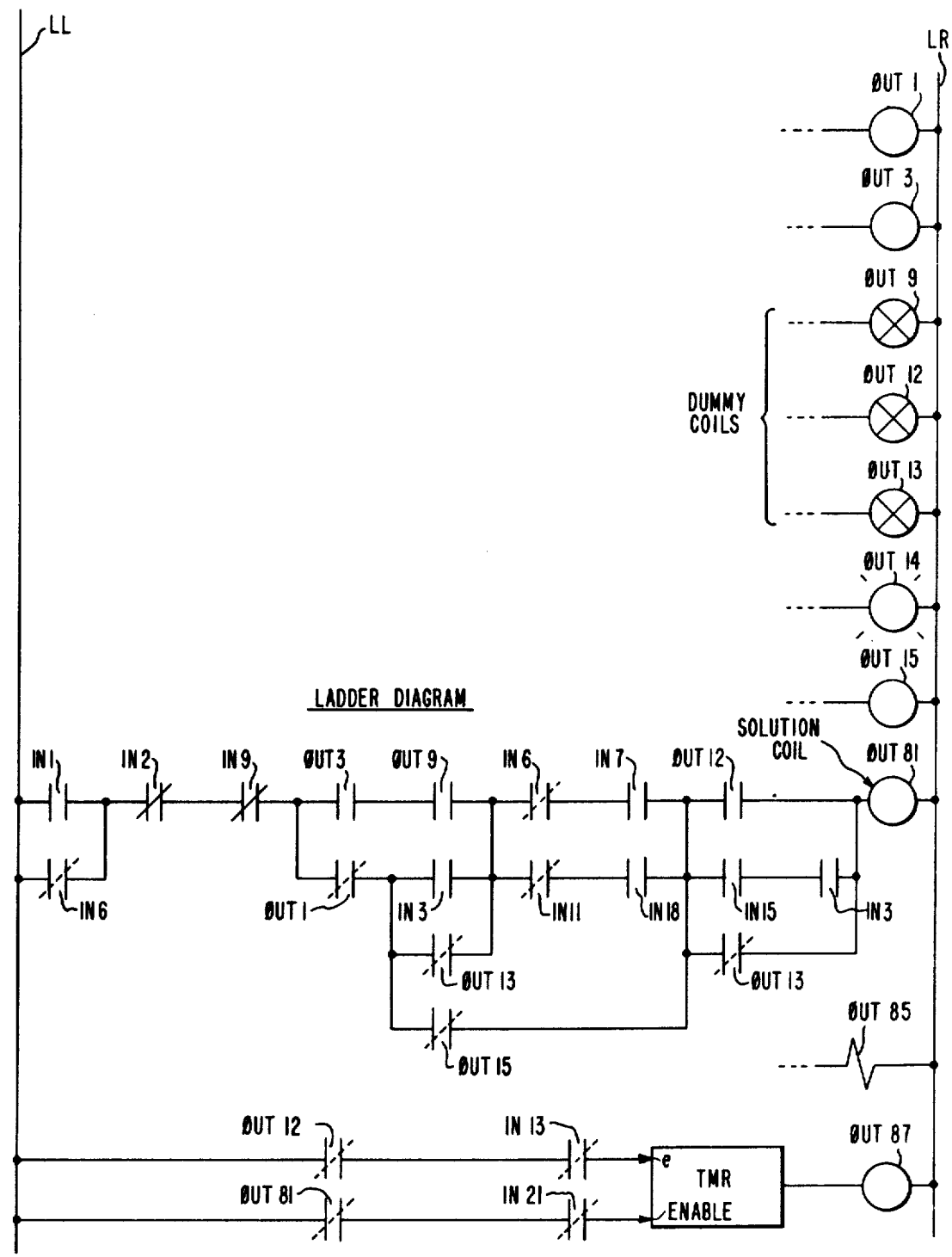
FIG. 2 shows an illustrative electrical relay ladder diagram of the kind conveniently solved by the programmable controller of FIGS. 1A through 1D.

Referring now to FIG. 2 and well as FIGS. 1A through 1D, the interaction of the programming panel PP and the other elements of the programmable controller PC is illustrated broadly. The purpose of the programming panel is to enter or load a ladder diagram, such as is shown in FIG. 2, into the programmable controller in a representative manner where the ladder diagram is subsequently solved. Although a detailed description of an example ladder diagram and the entry procedure and solution of the ladder diagram will be described hereinafter for purposes of illustration, suffice it to say at the present that a ladder diagram comprises two electrical buses or conductors between which are interconnected a series of input devices, such as relay contacts, and at least one output device, such as a coil. Typically, the two buses are shown schematically as parallel spaced apart, vertical lines. The combination of the input and output devices is shown as a horizontal arrangement where certain elements are interconnected with each other between the power lines. This arrangement leads to the term "ladder". A fully constructed diagram of the type previously mentioned has the appearance of a ladder, with a plurality of horizontal rungs and two spaced apart vertical risers. The output device or coil is typically shown on the right and the input devices are typically shown to the left of the output device. If a complete circuit exists in any rung of the ladder between the left vertical conductor and the right vertical conductor, the output device will be energized and will consequently perform any function for which it is intended. If, on the other hand, no complete circuit exists, the output device will not be energized. Thus, it can be seen that the purpose of the input devices or relay contacts is to form a complete circuit for the energization of the output device in appropriate circumstances. Applicable laws of electricity and mathmatics can be applied for the functions desired to determine the arrangement of the various contacts and their normal status, i.e., whether opened or closed. This is generally completed and predetermined at the time that the operator of the programming panel PP receives the schematic ladder diagram (FIG. 2) for entry into the programmable controller PC. The duty of the operator then is to transfer the schematically represented ladder diagram into the programmable control PC in the form of digital words in a proper sequence so that solution thereof can be accomplished by the line solver LS. It should be remembered that the actual switches or relay contacts do exist, for the most part, in the real world as do the output devices, such as the coils. One exception to the previous case may be the dummy coils described previously. Although most of the various devices which are depicted in the ladder diagram do exist, they are not interconnected one to the other in the arrangement shown in the ladder diagram. It is the duty of the operator of the programming panel PP to make the interconnections according to a predetermined set of rules associated with the programming process or according to hints or prompts provided by the programmable controller or the programming panel. Therefore, it can be seen that one of the most difficult tasks for the operator or the programmer of the programmable controller is to decide which contact is to be entered at which time and in what sequence in order to facilitate a correct solution of the ladder diagram. In the present case, a prompter is provided as part of the display module 50 of the programming panel PP. In addition, a remote display, not shown in FIGS. 1A through 1D but shown in FIGS. 5 through 9 and FIG. 12, may be provided to show the step-by-step construction of the ladder diagram as it is being formed or programmed by the operator of the programming panel PP. Typically, the entry of the ladder diagram into the programmable controller PC is done in one rung groups—that is, an entire group of relay contacts and the associated output device is entered as one rung, one element at a time, in the predetermined sequence. Each part of the incomplete rung is stored in the programming panel interface PPI, for example, until the central processing unit CPU is alerted to the fact that a rung has been completed, in which case the entire rung is shifted into the ladder memory LM of the programmable controller PC. In order to facilitate this action, the sixteen-bit address bus AB, the memory read signal MEMR and the memory write signal MEMW are utilized. The operator typically takes the ladder diagram and chooses a first rung for entry. Furthermore, the operator typically beings on the left side of the rung at the uppermost portion thereof for entry of the first device, which in almost all cases, is an input device. The operator makes the entry by depressing certain appropriate keys on the programming panel PP and by assigning certain address locations by way of the alpha-numeric keyboard of the programming panel, and by further identifying certain key attributes of the device to be entered, the purpose of which will be described in detail hereinafter. After an initial series of entry keys have been depressed, certain display functions are illuminated or otherwise provided by the display module 50, which leads the operator to enter other characteristics of the device, and ultimately to depress a key which indicates that the entire device or relay contact has been entered. The various attributes, address numbers and status information are then passed on to the programming panel interface PPI where they are temporarily stored until an entire cluster of input and output devices for one rung has been accumulated, after which the entire rung is moved over through the central programming unit CPU into the ladder memory LM. At the end of the entry of one contact, the display panel prompting system will provide an indication as to where the operator should go next in the rung of the ladder diagram to choose the next contact for entry. It has been found that the sequence of entry may be important for later solution, and thus a prompting system has been devised to insure that the sequence of entry is appropriate. Typically, the programmable controller PC is programmed by an operator through the use of the programming panel PP with its auxiliary display device (not shown in FIG. 1C) and its display module 50 only once to load the ladder diagram into the programmable controller PC. At this point, the programming panel PP is disconnected from the programmable controller PC for use with another programmable controller or for storage, if desired. If, at sometime in the future, it is desired to reprogram the programmable controller PC, or to change the program that is stored therein, the programming panel PP may simply be reconnected and the appropriate steps taken to achieve the desired results. On the other hand, as was described previously, the random access memory RAM acting in conjunction with the central processing unit CPU and the input-output interface IOI repeatedly samples the status of the real world switches or relay contacts, which are represented by a previously entered ladder diagram. This is mainly done to update the status of the switches. It is well known that normally open switches may close under certain circumstances and normally closed switches may open. That information is vital for the line solver LS of the programmable controller PC as it is information which is necessary to determine if a complete circuit exists between the two power supply lines LL-LR in the ladder diagram. Furthermore, the random access memory RAM, acting in conjunction with the central processing unit CPU and with the output cards OCR, constantly and repeatedly supplies output information to the various relay coils, indicating means and other coils to change the status thereof at appropriate times or to merely confirm that the present status is the correct one. This happens when the programmable controller is actually in operation. If it is in a shutdown state, none of the operations occur. In short summary, then, the ladder memory LM of the programmable controller PC is programmed initially by an operator operating with a programming panel PP to feed or load a digital representation of the ladder diagram into the programmable controller. Thereafter, the programmable controller PC periodically checks the status of input devices and supplies signals to output devices during sampling and distribution cycles of the programmable controller. In the interim periods during processing cycles, part of the data stored in the ladder memory LM and part of the data stored in the random access memory RAM are supplied to the line solver LS of the programmable controller PC for solution thereby. The solutions, in turn, are fed back to the random access memory RAM for distribution to the output devices.

The line solver LS comprises a number of important components. By referring jointly to FIG. 1B, FIG. 14B and FIG. 15, a description of the construction of the line solver and an explanation of its workings can be made. For purposes of convenience, the multiplexer or selector MPLX is described initially. The multiplexer MPLX has eight inputs identified as "0" through "7". Any one of these inputs can be directed to the output of the multiplexer as a function of the status of the control terminals of the multiplexer. The control terminals are identified by the reference symbol CT and by the digital coding "1", "2" and "4". If digital ones exist on the control terminals CT identified as "1" and "2", then input No. "3" is chosen to be fed through to the output (1+2=3). The output is identified as B. On the other hand, if digital ones exist on the "4" control terminal and the "1" control terminal of the multiplexer then input "5" is supplied to the output B (1+4=5). The output B is in turn supplied to a clock transfer device or bi-stable storage device PC. Clock transfer device PC may be a bistable multivibrator of the type known as a flip-flop. The latter device may be alternately called a P flop. The operating function of the device PC is to transfer whatever signal exists on its input terminal B to its output P (hence the name P flop) in accordance with the energization of its clock terminal CK by the clock pulse LSCK. The device PC has the additional function of providing a digital one on its output or P-node when the clear terminal PCL is actuated at the start of the solution of a rung by the clear signal LSCLR. The output of the P flop PC is provided simultaneously to one input terminal of an AND gate A1, to an output device TNP, to the "6" and "7" input terminals of the multiplexer or selector MPXL and to the serial load terminal SR of the left node stack LNS. Another input to the AND gate A1, is the output terminal A of an exclusive OR gate EOR. The exclusive OR gate EOR has two inputs, one of which is connected to the SBR output of the memory RAM and the other of which is connected to the NO/NC bit of the ladder memory LM (as shown in FIG. 1A). The latter two inputs provide information to the exclusive OR gate EOR concerning the normal status of the contact to be monitored—that is, whether it is normally opened or normally closed by way of the NO/NC terminal and the actual status—that is, whether it is in its normal state or not in its normal state by way of the SBR terminal. Consequently, it can be seen that the output of the exclusive OR gate EOR or terminal A is actuated to a digital one state if the contact in question is in a disposition to pass power, which means it is normally closed and in its normal state, or it is normally opened, but in its non-normal (closed) state. The inputs to the AND gate A1 therefore provides the answer to two questions—first, is there power available at the left node of the device or contact in question and second, is the contact in question in a state to transfer that power through the contact to the right node thereof. If the answer to both of these questions is yes, then it can be seen that the output of the AND gate A1 or terminal C should have a digital one disposed thereon. This output is provided simultaneously to three places. The first place is the serial load input terminal of a right node stack RNS, the second place is one input terminal of a two-input OR gate OR1. The third place is the multiplexer MPXL, specifically, the "0" and "4" terminals thereof. The output of the previously described OR gate OR1 is designated as the "E" terminal. The other input terminal of the OR gate OR1 is connected to the serial output D of the right node stack RNS. The output E of the OR gate OR1 is connected to two places. The first place is the parallel load input cell PL of the previously mentioned right node stack RNS. The other place is the multiplexer MPXL at the "1" and "5" input terminals thereof. The output terminal of the left node stack LNS is designated F and it is connected to the "2" and "3" input terminals of the multiplexer MPXL. The right side of the PC flip-flop or the P terminal represents the power status of the current left node being solved in the line solver LS. The B terminal, or the output of the multiplexer MPLX represents the power status of the left node of the next contact to be solved. At the occurence of the clock pluse LSCK the next left node information is transferred through the bi-stable storage device PC to the current left node output P. Thus, a solution is implemented in the line solver LS by moving through the contacts to be solved in an appropriate order one step at a time as determined by the inputs to the exclusive OR gate EOR and by signals on inputs to control terminals CT of the multiplexer MPXL and control terminals CONT on the left node stack LNS and the right node stack RNS. Both the left node stack LNS and right node stack RNS control input terminals perform the following functions when read from left to right, as viewed in FIG. 14B. "10" means a shift in (SI)—that is, any information contained in the stack cells and on the input terminals thereto will be shifted further into the cells, as viewed in FIG. 14B. On the other hand, a "01" on the control terminals CONT will shift the information back the other way or out (so). An "00" on the control terminals CONT means that no action will take place; and "11" on the control terminals CONT means a parallel load will take place at the terminal PL for the first cell of the stacks. This latter case applies only to the right node stack RNS where the information contained on terminal E is shifted into the first cell at PL for being monitored by terminal D without any change taking place in the other cells below it. The data at the various input terminals and output terminals may be shifted in accordance with the signal alignment on the control terminals CONT, as previously described, at the time of the presence of the leading edge of a clock pulse LSCK on the clock terminal CK. This clock pulse LSCK is the same as is supplied to the device PC for shifting information from the B or input terminal thereof to the P or output terminal thereof. The control terminals CONT of the right node stack RNS are connected, as is shown in FIG. 14B, to receive the RETURN signal (—||—⎯) on the left and the UP signal (—|⎯|—⎯) on the right. The control terminals CONT for the left node stack LNS are connected to receive the OPEN signal (⊏⏐⎯) on the left and RETURN signal (—⎯| ⏐⌐) on the right as shown in FIG. 14B. The control terminals CT for the multiplexer are connected as follows: conrol terminal "1" is connected to the UP signal; control terminal "2" is connected to RETURN signal; and control terminal "4" is connected to OPEN signal. The latter three signals, as is best shown in FIGS. 1A and 1B, come from line drivers connected to appropriate lines in the sixteen-bit data bus DB, which in turn are connected to the RETURN, UP and OPEN outputs of the ladder memory LM. Thus, as the ladder memory LM is activated to provide data to the line solver LS, information contained on the RETURN, UP and OPEN lines, as well as the normally closed normally opened line NO/NC , is provided to the appropriate drivers in the line solver LS for utilization in the solution of one contact or device at a time. At the same time, as was mentioned previously, address information is supplied to the RAM memory RAM, which is utilized to supply an output signal on the SBR terminal to be utilized to determine whether the device in question is in a disposition for passing power or not. The line solver LS will iterate. one iteration per clock pulse, to pick up attribute data and RAM memory unit output data for each control device such as a relay in a proper sequence for solving the entire rung of a relay ladder diagram until an output device or coil is reached. When this happens the special function SF output of the ladder memory will be utilized in conjunction with the output circuit OC of the line solver LS to enable the TNP or TNSO output line drivers to provide information back to the output data locations 36 in the RAM memory as shown in FIG. 1A. This information will be useful in subsequent solutions of other rungs of the ladder diagram and in providing real world output data to the output cards in the output card rack OCR (see FIG. 1D) for causing the status of the output devices to be consistent with the most recent solution.

Figure 3A:
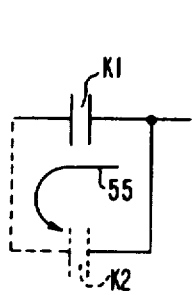
FIG. 3A shows a sequence map for serially entered relays for a first Rule 1 prompting situation.
Figure 3B:
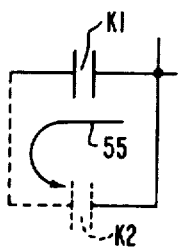
FIG. 3B shows a sequence map for serially entered relays for a second Rule 1 prompting situation.
Figure 3C:
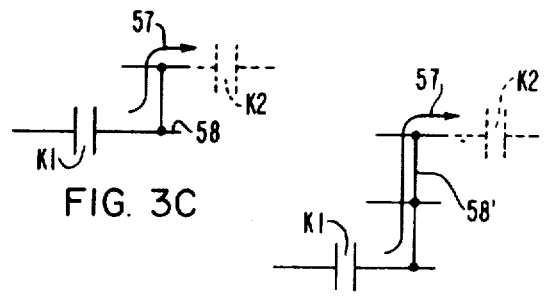
FIG. 3C shows a sequence map for serially entered relays for a first Rule 2 prompting situation.
Figure 3D:
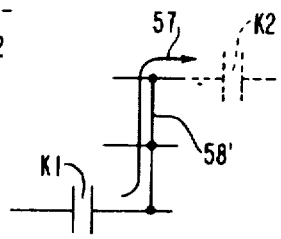
FIG. 3D shows a sequence map for serially entered relays for a second Rule 2 prompting situation.
Figure 3E:
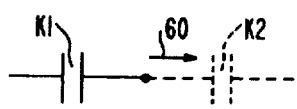
FIG. 3E shows a sequence map for serially entered relays for a first Rule 3 prompting situation.
Figure 3F:
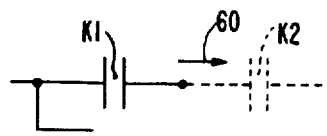
FIG. 3F shows a sequence map for serially entered relays for a second Rule 3 prompting situation.
Figure 3G:
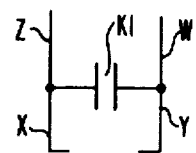
FIG. 3G shows a relay contact with interconnection portions identified in terms of interconnection sequence attributes.

Referring now to FIGS. 3A through 3G and FIG. 1C, an explanation of relay contact attributes and entry procedure is given. FIG. 3G specifically shows a relay contact K1 with four possible interconnection leads W, X, Y and Z. It has been found that only three of these four interconnection leads need be formed into graphical attributes to describe the interconnection of any contact with another. The reason for this is that the fourth attribute can be implied by the existence of other attributes under certain conditions. In entering the relay ladder diagram, each of the attributes occupies one binary bit of a memory word in the programmable controller PC. As an example, by referring to FIG. 1A once again it can be seen that the attributes RETURN, UP and OPEN are identified symbolically. Furthermore, the 12th through 14th bits, as read from the right, of the ladder memory LM, represent the bits in which the previously named attributes are digitally stored, respectively. The three bits or attributes can occur in any order for a contact; and are not order dependent. If a given contact K1 exists in a ladder diagram and a lead W exists as is shown in FIG. 3G, that contact is said to have the UP attribute. On the other hand, if a contact K1 is interconnected with a contact immediately below it or below it and to the right of it, such as is indicated by the interconnection X, then the OPEN attribute is said to exist with respect to contact K1. In addition, if the contact K1 has another contact interconnected with it from directly below or below and to the left, then the attribute identified by the reference symbol Y or the RETURN attribute is said to exist. There is also a fourth attribute, identified by the reference symbol Z which has no name, as it is not positively entered into the controller PC but is implied by the absence or presence of other attributes in a manner which will be described hereinafter. Utilizing all of the attribute symbols, it can be found that any one contact, K1 for example, can have only eight combinations of attributes, not counting the attribute Z, which is implied. (See Table 1 for a cryptic summary of the action of certain apparatus within the line solver LS as a function of contact attributes.

contact, that is, a contact with both an UP and a RETURN attribute, the present right node value at C is ORed, with the last value stored in the right node stack RNS at D; and the result thereof E is stored back into the right node stack RNS at the parallel load terminal PL. The last value stored in the left node stack LNS at F represents the left node of the next contact at B. For a type 5 contact, that is, a contact having only an OPEN attribute, the value of the current right node at C represents the left node of the next contact at B. Furthermore, the value of the left node of the present contact P is stored in the left node stack LNS. For a type 6 contact, that is, a contact having only an OPEN attribute and a RETURN attribute, the value of the left node of the present contact at P is the value of the left node of the next contact at B; and the value of the right node of the present contact at C is stored into the right node stack RNS for future use. For a type 7 contact, that is, a contact having an UP attribute and an OPEN attribute, the value of the current left node at P is stored into the left node stack LNS. The present right node value at C is ORed with the last value stored in the right node stack RNS and the result represents the left node of the next contact at B. Finally, for a type 8 contact, that is, a constant having all three attributes, the value of the current left node at P is the value of the next left node at B. The value in the right node stack RNS is ORed with the value at C and then returned to the right

TABLE 1

| OPEN | RETURN | UP | INPUT TO PC | INPUT TO LNS | OPERATION ON LNS | INPUT TO RNS | OPERATION ON RNS |
|------|--------|-----|-------------|--------------|-------------------|---------------|--------------------|
| 0 | 0 | 0 | A . P→P | X | — | X | — |
| 0 | 1 | 0 | LNS .→P | X | POP | A . P→RNS | PUSH |
| 0 | 0 | 1 | (A . P) + RNS→P | X | — | X | POP |
| 0 | 1 | 1 | LNS →P | X | POP | (A . P) + RNS→RNS | PARALLEL LOAD |
| 1 | 0 | 0 | A . P→P | P→LNS | PUSH | X | — |
| 1 | 1 | 0 | P→P | X | — | A . P→RNS | PUSH |
| 1 | 0 | 1 | (A . P) + RNS →P | P→LNS | PUSH | X | POP |
| 1 | 1 | 1 | P→P | X | — | (A . P) + RNS→RNS | PARALLEL LOAD |

The eight interconnection combinations are as follows: OPEN only, UP only, RETURN only, OPEN and UP, OPEN and RETURN, UP and RETURN, OPEN, UP and RETURN and the last situation where there is no OPEN, no UP and no RETURN. With these eight possible contact interconnection configurations, any planar graph can be entered into the programmable controller PC. There are eight instructions that the three attributes can code. Each of these instructions specifies a fixed execution of Boolean storage and recall processes which will evaluate the relay ladder rung stored in the memory. Recalling the line solver LS construction, as described previously with repect to FIG. 1B, the following can be said about the eight types of contact interconnections: a contact type 1 (no UP, no OPEN, or no RETURN) causes the result of the ANDing of the left node to the present contact, Point P, with the A signal to form the left node for the next contact. For a type 2 contact, that is, a contact with only a RETURN attribute, the right node value of the present contact (i.e. A.P) at C is stored in the right node stack RNS. The last value stored into the left node stack LNS at F is recalled, F represents the left node status of the next contact B. This value is the input for the flip-flop PC. For a type 3 contact, that is, a contact having only an UP attribute, the last value stored in the right node stack RNS at D is ORed with the value now respresenting the right node at C; and the result at E represents the left node of the next contact at B. For a type 4 node stack RNS. Summarizing to this point, it has been found that any contact which exists in a ladder diagram can be identified by any combination of three interconnection attributes, UP, OPEN and RETURN. These contacts can be entered through the programming panel PP into the ladder memory LM of the programmable controller PC for use by the line solver LS in solving an array of interconnected contacts. The left node stack LNS and right node stack RNS are utilized in conjunction with the multiplexer MPLX and the various gates as has been described previously. Since most of the contacts to be entered from a ladder diagram into the programmable controller PC are in the form of some sort of rung matrix, and since the line solver LS proceeds sequentially one contact at a time to arrive at an ultimate solution, it has been determined that according to the arrangements of the various attributes, an appropriate entry scheme is necessary. Furthermore, because of the characteristics of the attributes and the line solver LS, the contact next to be entered can always be determined, either by observation or more importantly, by a prompting or clueing system utilized with respect to the programming panel PP. It has been determined that the entry process requires the utilization of three rules. The rules are as follows:

1. If there is a RETURN attribute associated with the contact in question, start from a point underneath the contact in question and to the right thereof and draw an imaginary line counterclockwise following the existing lines or branches of contacts without crossing one until a contact is approached from left to right. This latter contact will be the next contact to be entered.

2. If there is an UP attribute, but no RETURN attribute, start at a point above and to the right of the contact to be entered and draw a vertical line unitl a contact can be approached from left to right without crossing a vertical interconnecting conductor. The latter contact is the next contact to be entered.

3. If there is neither the UP nor a RETURN attribute, start to the right of the contact in question and move to the next contact to the right on the same horizontal line.

Referring to FIGS. 3A and 3B, the Rule No. 1 situation is shown. In this case, line 55 is started to the left and below contact K1 and circles around until K2 is approached from left to right. Note that no conducting line is crossed by the line 55. As is to be expected, the contact K2 is the next contact to be entered in sequence. Referring to FIG. 3C and FIG. 3D, examples of the second rule are shown. In this case, starting above and to the right of contact K1 in each case, a line 57 is drawn first vertically parallel to the conducting lines 58 and 58' until line 57 can be bent around to the right to approach a contact K2 from left to right without crossing a conductor. Contact K2 in this case is the next contact to be entered. Finally, FIGS. 3E and 3F show the utilization of the third rule. In this case, a horizontal line is started from the right of contact K1. The next contact to be entered is indicated by the horizontal line 60 approaching contact K2 from left to right. Note, as is well shown in FIG. 3F, that this rule applies even though an OPEN is shown to the left of contact K1.

Referring to FIG. 1C and the programming panel PP and the indicating means 50 associated therewith, a readout portion having symbolic indicating means 55A, 57A and 60A are shown. The latter means are associated with arrows or directions 55, 57 and 60 respectively shown in FIGS. 3A through 3F. When a present or current contact is entered along with its appropriate attributes, a determination is made as to where on the ladder diagram the operator is to find the next contact to be entered. One of the arrows 55A, 57A or 60A will illuminate or otherwise indicate. At that time, the operator searches the ladder diagram in accordance with the direction indicated by the appropriate arrow until he finds the next contact to be entered, after which, the next sequential entry may be made. This iterative process will continue until all the contacts in the relay diagram have been entered in the appropriate sequence.

Figure 4:
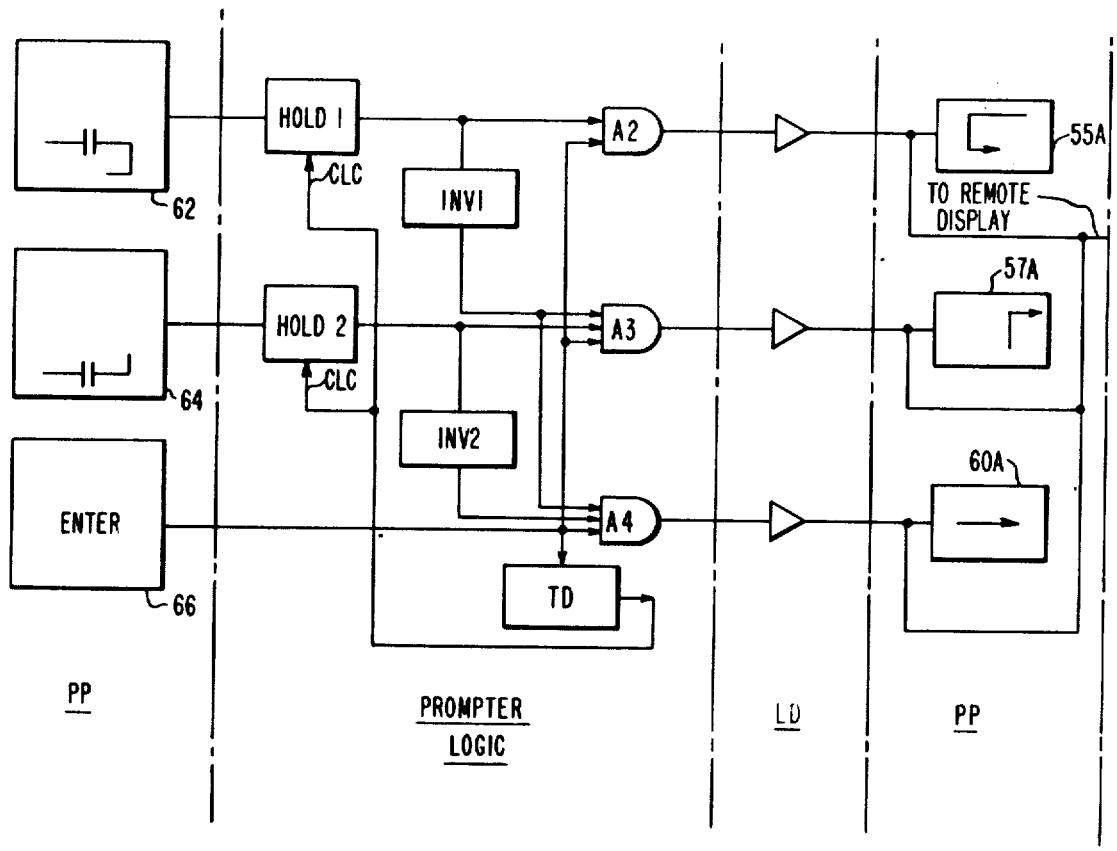
FIG. 4 shows a representative entry prompter.

Referring now to FIG. 4 as well as FIG. 1C, non-limiting hardware prompter logic apparatus or circuitry for implementing the utilization of the prompting rules, as described previously, is shown. To the left in FIG. 4 are shown three entry keys 62, 64 and 66 for the programming panel PP. To the right of them in FIG. 4 is shown the prompter logic circuitry. To the right of that in FIG. 4 are shown lamp drivers LD; and to the right of them are shown at the previously mentioned display or indicating lamps or arrows 55A, 57A and 60A of the programming panel PP. The signals provided to the aforementioned display lamps may be provided in parallel, or in any other convenient manner to a remote display (not shown) in which the accumulated ladder diagram is displayed contact by contact during the entry process. The RETURN key 62, the UP key 64 and the ENTER key 66 are shown schematically and are presumed to be devices or keys (but are not limited thereto) which produce digital logic signals such as ones and zeros, for example, which are of sufficient magnitude and polarity to actuate the prompter logic in appropriate circumstances. For purposes of simplicity of illustration, it is to be presumed that the depression of any of the aforementioned keys will produce a digital one at its output. The prompter LOGIC includes a first hold circuit HOLD 1 which is interconnected at its input with the output of the RETURN key 62. The output of the HOLD circuit HOLD 1 is provided simultaneously to the first input of an AND gate A2 and to the input of an inverter INV 1. The output of the AND gate A2 is provided to one of the lamp drivers in the lamp driving section LD, and from there to the display symbol 55A and a remote display, if desired. The output of the UP key 64 is provided as an input to a second hold circuit HOLD 2. The output of the second hold circuit is provided simultaneously to one input of an AND gate A3 and to the input of an inverter INV 2. The output of the AND gate A3 is provided to a lamp driver in the lamp driving section LD and from there to the UP display symbol 57A of the programming panel and to a remote display, if desired. The output of the ENTER key 66 is provided simultaneously to a time dealy circuit TD, to the second input of the AND gate A2, to a second input of the AND gate A3 and to a first input of an AND gate A4. The output of the AND gate A4 is provided to a lamp driver in the lamp driving section LD and from there to the display symbol 60A on the programming panel PP and to a remote display if desired. The output of the inverter INV 1 is provided to a third input of the AND gate A3 and to a second input of the AND gate A4. The output of the inverter INV 2 is provided as a third input of the AND gate A4. The output of the time delay TD is provided simultaneously to the clearing terminals CLC of the hold circuit HOLD 1 and the hold circuit HOLD 2. In operation, therefore, if the RETURN key 62 is depressed, the hold circuit HOLD 1 is actuated to provide an input on the first terminal of the AND gate A2 and to simultaneously disable AND gates A3 and A4 by providing zero digital signals to inputs thereof from the inverter INV 1. Consequently, when the ENTER key 66 is depressed, a second digital 1 signal is provided to the AND gate A2, thus actuating the output thereof to energize the display 55A. After a short time delay, the time delay circuit TD provides a clearing signal for the hold circuit HOLD 1. If the RETURN key 62 is not depressed, but rather the UP key 64 is depressed, the hold circuit HOLD 2 is actuated to provide an output, which is provided to one input of the AND gate A3. Since the RETURN key 62 has not been depressed, the output of the inverter INV 1 will be a digital one. When the ENTER key 66 is depressed, a third digital one will appear on the input of the AND gate A3, thus actuating the output thereof to cause the indicating or prompting device 57A to illuminate or otherwise indicate. A short time after the ENTER key has been depressed, a clearing signal will be provided to the hold circuit HOLD 2 by way of the time delay circuit TD. Finally, if neither the RETURN key 62 nor the UP key 64 are depressed, when the ENTER key 66 is depressed, the AND gate A4 will have all three inputs thereof at digital one, thus providing a digital one at the output thereof, thus energizing the indicating symbol shown at 60A. Of course, in all the aforementioned cases, signals may be alternately or additionally provided to the remote display by the parallel lines shown in FIG. 4.

Figure 5:
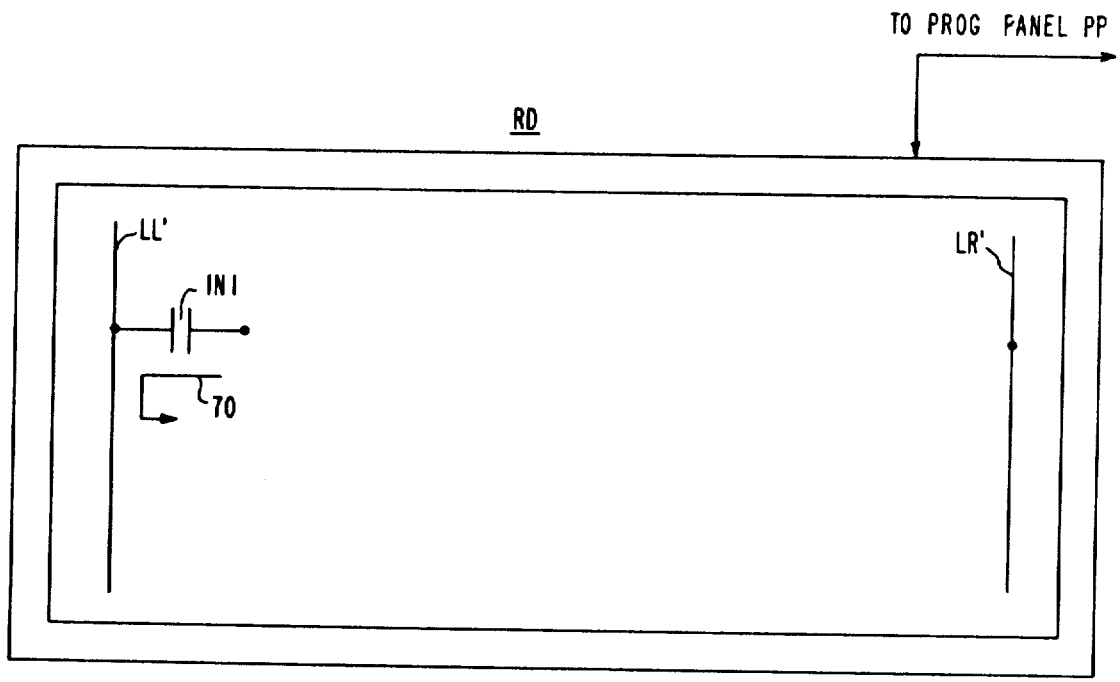
FIG. 5 shows a display for a ladder diagram entry apparatus prompting system for a first entry stage for the ladder diagram of FIG. 2.
Figure 6:
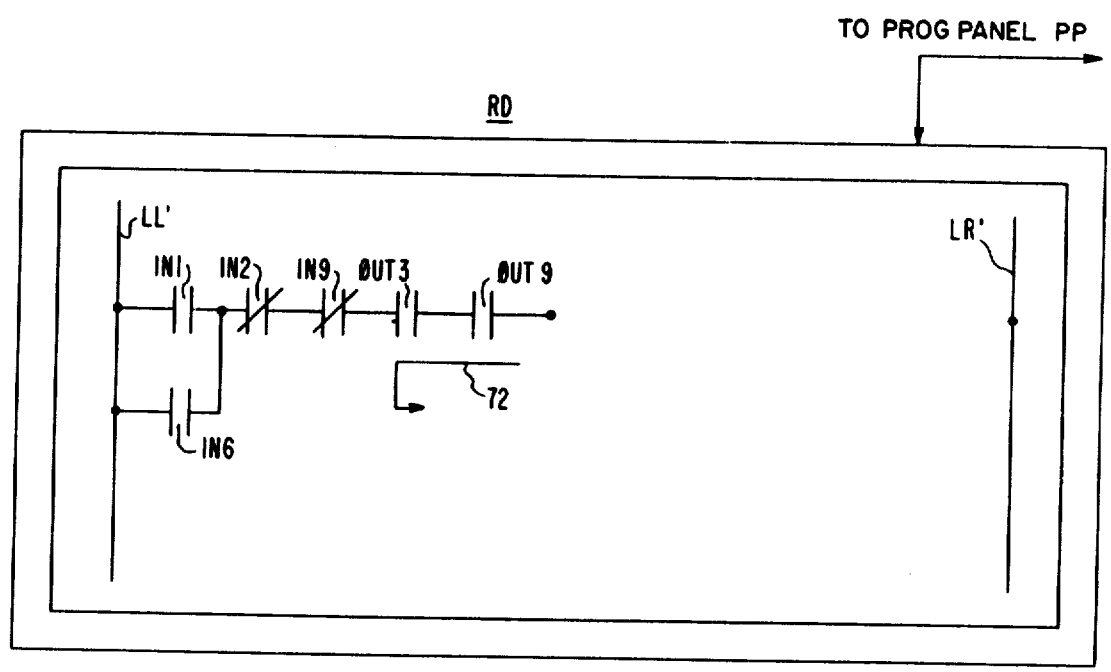
FIG. 6 shows a display for a ladder diagram entry apparatus prompting system for a second entry stage for the ladder diagram of FIG. 2.
Figure 7:
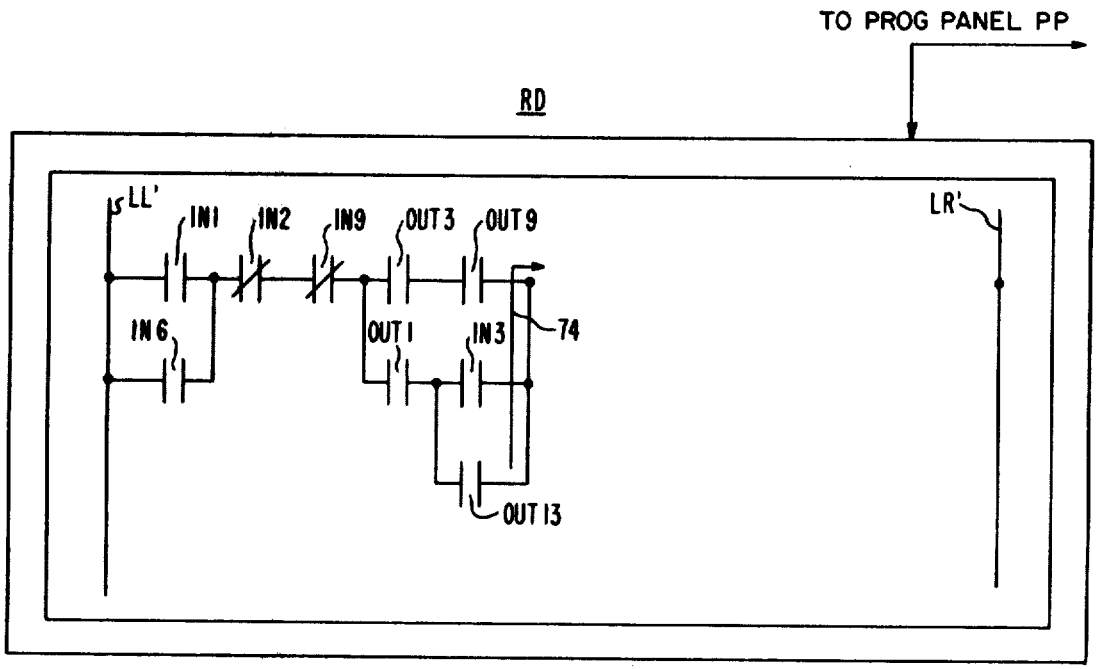
FIG. 7 shows a display for a ladder diagram entry apparatus prompting system for a third entry stage for the ladder diagram of FIG. 2.
Figure 8:
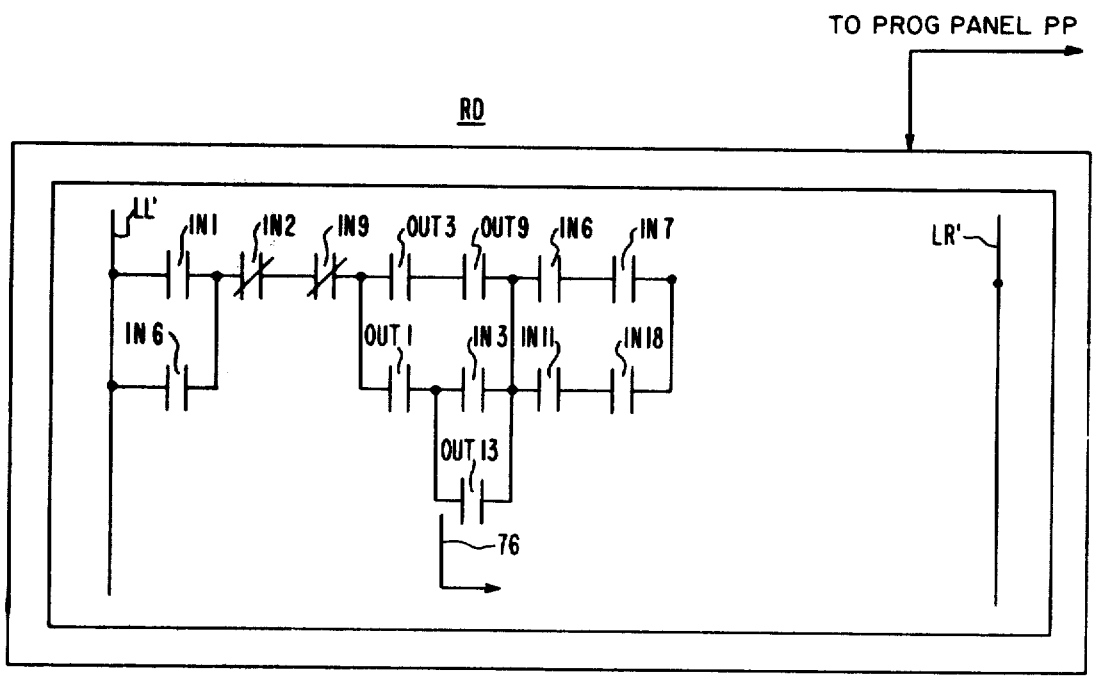
FIG. 8 shows a display for a ladder diagram entry apparatus prompting system for a fourth entry stage for the ladder diagram of FIG. 2.
Figure 12:
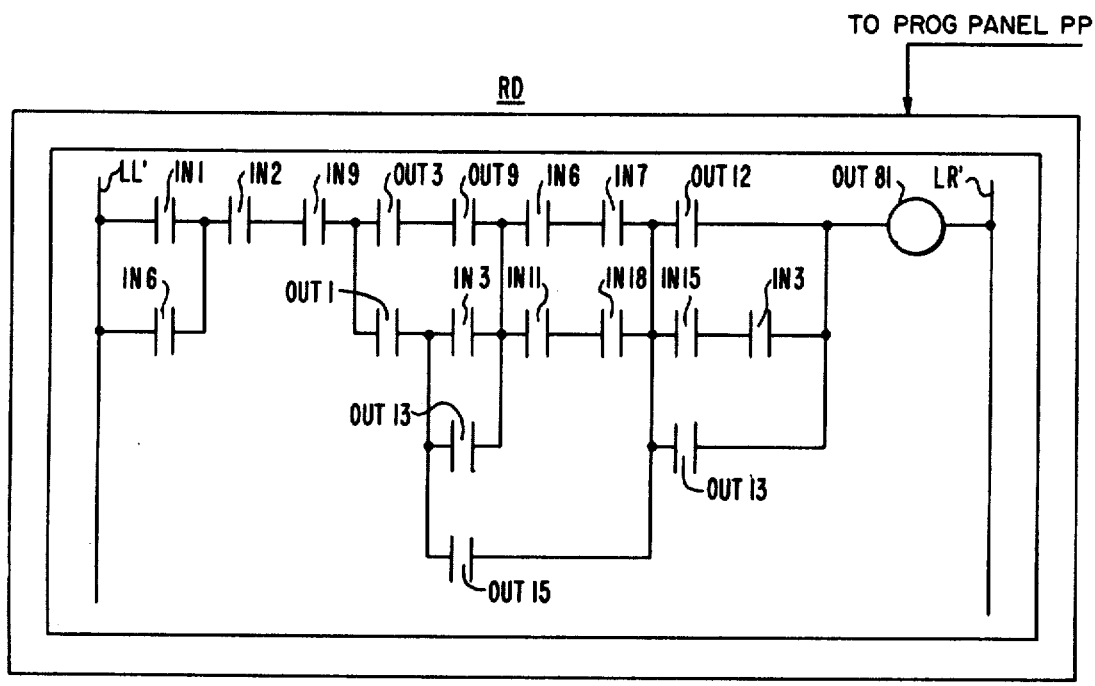
FIG. 12 shows a display of the ladder diagram of FIG. 2 after entry has been completed in the sequence depicted in FIGS. 5 through 9.

Referring now to FIGS. 1A through 1D, FIG. 2 and FIGS. 5 through 10 and 12, an example of an existing ladder diagram with an illustration of its entry into the ladder memory LM of the programmable control PC is depicted. FIG. 2 shows a non-limiting partial ladder diagram example with two completed rungs and eight incompleted rungs. There are provided a left energizing bus LL and a right energizing bus LR, both of which are of different voltage potentials and one of which may be at zero or ground potential during energization. For purposes of illustration, it is presumed that bus LR is at ground potential in this case. The first incompleted rung includes a coil OUT 1. The second rung includes a coil OUT 3. The third rung includes a dummy coil OUT 9. The fourth incompleted rung includes a dummy coil OUT 12. The fifth incompleted rung includes a dummy coil OUT 13. The sixth incompleted rung includes a lamp OUT 14. The seventh incompleted rung includes a coil OUT 15. The eighth incompleted rung includes a resistive element OUT 85. The first or main completed rung includes numerous interconnected relay contacts and an output coil OUT 81. The output coil is identified as the solution coil for purposes of illustration. On the left, input contacts IN 1 and IN 6 are connected in parallel. The left side of each is connected to the left power line LL. The common right side of each is connected to one side of a normally closed relay contact IN 2, the right side of which is connected to the left side of a normally closed relay contact IN 9. The right side of this coil is connected concurrently to the left side of a normally open relay contact OUT 3 and to the left side of a relay contact OUT 1. The right side of the relay contact OUT 3 is connected to the left side of relay contact OUT 9; and the right side of the relay contact OUT 1 is connected to the left side of relay contact IN 3. Furthermore, a relay contact OUT 13 is connected in parallel with the relay contact IN 3. The right sides of the relay contacts OUT 9, IN 3 and OUT 13 are connected together, and collectively to the left side of a relay contact IN 6 and the left side of a relay contact IN 11. The right side of the relay contact IN 6 is connected to the left side of a relay contact IN 7; and the right side of the relay contact IN 11 is connected to the left side of a relay contact IN 18. The right side of the relay contact IN 7 and the right side of the relay contact IN 18 are connected together and to the right side of a relay contact OUT 15, the left side of which is connected to the junction between the relay contact OUT 1 and the relay contact IN 3. Connected to the common junction representing the right sides of the relay contacts IN 7, IN 18 and OUT 15 are the left side of a relay contact OUT 12, the left side of a relay contact IN 15 and the left side of a relay contact OUT 13. The right side of a relay contact IN 15 is connected to the left side of a relay contact IN 3. The right side of the relay contact IN 3 is connected in common with the right side of the relay contact OUT 12 and the right side of the relay contact OUT 13. This common junction is connected to the left side of the prevously described solution coil OUT 81, the right side of which is connected to the left bus LR. The second completed rung includes a timer circuit comprising a relay contact OUT 12 connected at its left side to the line LL and at its right side to a left side of a relay contact IN 13, the right side of which is connected to one terminal e of the timer TMR. In a like manner, the left side of a relay contact OUT 81 is connected to the left line LL and the right side thereof is connected to the left side of a relay contact IN 21, the right side of which is connected to the ENABLE terminal of the timer TMR. The output of the timer TMR is connected to the left side of a coil OUT 87, the right side of which is connected to the right power bus LR. Referring once again to the main rung of the ladder diagram, it is to be noted that a number of inputs and outputs appear more than once. To be specific, relay contacts IN 6 appear twice and relay contacts IN 3 appear twice. Those relay contacts identified with the reference symbols IN are opened or closed in reality by the movement of switches connected to appropriate input cards shown in FIG. 1C. As an example, card 001 shown in FIG. 1C has a switch identified as IN 1, which may be opened or closed, depending upon the conditions existing in the circuit to which the switch is connected. Note, for purposes of simplicity of illustration some cards are identified with double zeros to be consistent with markings on the commercial embodiment, while the corresponding diagrammic entry may or may not delete the double zero. It is to be noted that a number of the relay contacts are identified by output symbols. Each of these relay contacts represents the auxiliary contacts of a real or imaginary coil shown in the incompleted rungs of FIG. 2. For example, relay contact OUT 3 represents the auxiliary contact for the coil OUT 3 in the second incompleted rung. If this coil is shown to be energized, then the relay contact OUT 3 will change state to the normally closed state. It is also to be noted that there is an output coil OUT 009 which does not exist in the real world, but which is shown schematically in the ladder diagram of FIG. 2. If this dummy coil is determined to be energized then the relay contacts OUT 9 will close. These latter contacts exist only within the programmable controller PC. For purposes of clarity of illustration, it is presumed that the normally opened relay contacts IN 006, IN 011, OUT 1, OUT 13 and OUT 15 are in the non-normal, or closed, state. With regard to relay contacts IN 006 and IN 011, this means that a normally opened switch IN 006 of card 1 of FIG. 1C and a normally open switch IN 011 of card 2 of FIG. 1C are now in the non-normal or closed state. With regard to the relay contacts designated OUT 001, OUT 013 and OUT 15, this means that the output coil OUT 001 shown at the top of the ladder diagram, but not in the cards represented in FIG. 1D, is energized. Dummy relay coil OUT 13, which also does not exist in the real world, is nevertheless depicted as energized. The way in which the actual status of the real and imaginary coils and output devices and the associated input devices is determined will be described hereinafter. It is to be presumed at this point that an operator capable of operating or entering a relay ladder diagram into the programmable controller has before him the ladder diagram of FIG. 2. For purposes of simplicity of illustration, the illustrative example which is to follow will deal only with the entry of the completed two rungs of the ladder diagram of FIG. 2. The operator is to enter first the contact in a rung which is to the left and above all other contacts in that rung. Obviously, the operator will determine that this is contact IN 1 for the rung in question. The operator will initially depress the normally opened contact key 80 shown on the programming panel PP of FIG. 1C. Although data is not transferred immediately to the ladder diagram, this has the effect of setting up the first bit to the left of the schematically representative ladder memory LM shown in FIG. 10 with a digital 0 to indicate that no special function is involved with this entry. A digital one in this memory position would indicate that a special function is being placed in the memory. A special function is utilized to help identify a coil or other special device. Furthermore, since the key 80 has been depressed, the operator will choose not to depress the COIL key nor the output key OUT. Furthermore, since key 80 or the normally opened contact key is reserved for normally opened contacts, a digital 0 will be placed in the second memory position to the left in FIG. 10, identified by the reference symbol NO/NC. Furthermore, since device IN 1 is defined as an input device rather than an output device, a digital 0 will be placed in the sixth memory location to the left of FIG. 10, identified by the reference symbol IN/OUT. At this point, the operator would identify and enter the key attributes. It can easily be seen that the contact IN 001 (using the alternate reference designations) has two interconnection attributes, namely, OPEN and RETURN. The operator would depress the OPEN key 82 which would have the effect of putting a digital 1 in the third memory location from the left of FIG. 10, identified by the reference symbol OPEN; and he would also depress the entry key 62, indicating there there is a RETURN and thus placing a digital 1 in the fifth entry location from the left of FIG. 10, identified by the reference symbol RETURN. It will be noted that the entry key 64 for the UP attribute is not depressed, as contact IN 001 has no UP attribute. This will thus place a digital 0 in the fourth memory location in the first line of the ladder memory achematically represented in FIG. 10. At this point, the operator may choose to assign a numerical designation to the apparatus symbolically placed in the memory. He would do this by depressing the "0" key twice in sequence and then the "1" key. Finally, the operator would depress the ENTER key 66 and place all of the previously disclosed information into the program panel interface PPI for subsequent delivery to the ladder memory LM. In particular, the ladder memory of FIG. 10 is laid out with the most significant bits on the left and the least significant digits on the right. On the far left, the "DATA DESIGNATION" has been made for purposes of illustration and is not part of the memory. On the far right, the numerically entered "LADDER MEMORY SEQUENTIAL WORD" is designated, but this is also not part of the memory. Consequently, by referring to FIG. 10, it can easily be seen that the first word entered, "WORD 001" is the first sequentially entered word in the ladder memory LM and has been designated IN 001. The last ten ladder memory bits to the right are designated for numerical identification. In the present case, a digital 1 exists only in the very last bit place, indicating a numerical 1 designation for the device in question. After the operator has placed the first contact IN 1 into the first word of the memory, this contact may be displayed in its proper sequence on the display panel RD as shown in FIG. 5. Its alphanumeric designation IN 001 will also be shown. Furthermore, in keeping with the prompt entry rules, as implemented by the prompt entry device shown in FIG. 4, an arrow 70 will be displayed to indicate to the operator to which portion of the rung of the ladder diagram in question he is to move to find the next contact to enter into the ladder memory LM to maintain proper sequence for effective solution at a later time. In a like manner and simultaneously with the display on the display panel RD of FIG. 5, the symbol 55A will illuminate in the graphical display 50 of the programming panel PP. It will be noted that this symbol is generally of the same shape and characteristic as the arrow 70 of FIG. 5. Having the prompting information before him, the operator will be guided to contact IN 006 of FIG. 2, which is disposed directly beneath contact IN 001 in FIG. 2. It will be noted that in FIG. 2 this contact is designated as being closed; however, in actuality, this is a normally opened contact and will be treated as such in the entry procedure. The contact is shown closed in FIG. 2 because, for purposes of illustration in regard to other aspects of the invention to be described hereinafter, the actual switch which is represented by this contact has been arbitrarily chosen to be in a closed, or non-normal, state, even though its normal state is open. To enter contact IN 6 into the memory the operator depresses the entry key 80 and then enters the attribute UP by depressing the entry key 64. After this, he designates alphanumerically the symbol for the contact by depressing the "0" key twice and then the "6" in sequence. He then depresses the ENTER button 66, which moves the foregoing information into the programming panel interface PPI for subsequent delivery to the actual ladder memory LM. This also places the contact in the proper position on the remote display panel RD. Concurrent with this, the symbol 57A in the display 50 of the programming panel PP illuminates to indicate that the next contact to be chosen is above and to the right of contact IN 6 as viewed in FIG. 2. By the latter operations the operator has placed the second word or word 002 in the ladder memory LM in the proper sequence. This word is designated IN 006. There are digital zeroes for every memory location in the second word, except there are digital ones in the UP location, in the "2" location and the "4" location (2 and 4 adding up to 6). At this point, the operator is directed by the prompter to the normally close input contact IN 2. In this case, it is to be noted that contact IN 002 is normally closed, and therefore must be entered as a normally closed contact. The operator therefore depresses contact key 84, which is the normally closed contact key. There is no special function involved here, nor is there an input involved so those keys will not be depressed. When the time is proper for entering the attributes, the operator will observe that the contact IN 2 has no special attributes, and consequently, none will be entered. Finally, the operator will depress the proper keys on the keyboard for entering a digital 1 in the "2" memory location of the ladder memory LM of FIG. 10. It should be noted at this time that the operator has entered the third sequential word, or "WORD 003", into the memory. It is designated as an input word IN 002. Furthermore, since this is a normally closed contact, the second memory location from the left as viewed in FIG. 10 will have a digital 1 therein. This is what is utilized to designate the normally closed contact state. After contact IN 002 has been entered by the depression of the ENTER button 66, the prompting apparatus will cause the indicator 60A to illuminate, indicating to the operator that normally closed contact IN 9 immediately to the right of normally closed contact IN 2 in FIG. 2 is the next to be entered. The operator will depress the normally closed contact key 84 and assign the data designation number 009 to the contacts. When the ENTER key 66 is depressed, the programming panel will shift the appropriate data into the programming panel interface PPI. In particular, the contact will be identified as IN 009, as is shown in FIG. 10; and a digital 1 will be present in the normally opened, normally closed NO/NC location and in the digital "8" and digital "1" locations. This will represent sequential "WORD 004" in the ladder memory LM. Furthermore, the prompting apparatus associated with the programming panel PP will actuate the indicator arrow 60A in the indicating portion 50 thereof, thus prompting the operator to move to the next contact, which is identified as OUT 3 in FIG. 2. Since this is a normally opened contact, the operator will actuate the normally opened contact key 80 and the OUT key 85, then using the alphanumeric keyboard, the operator will assign the reference numeral 003 to the contact. At this point, the operator will depress the ENTER key 66, shifting the information into the programming panel interface PPI and enabling the prompter in the programming panel PP to actuate the prompting arrow 60A to indicate that the next contact to be entered is OUT 009, as shown in FIG. 2. With respect to contact OUT 003, the depression of the OUT key 85, will place a digital 1 in the sixth input location from the left, as viewed in FIG. 10. This location is designated IN/-OUT. It is the sixth most significant digit in the memory word. The ten significant digits following it constitute digital numbers which are utilized to encode the identification number. The IN/OUT memory location is utilized in conjunction with the random access memory RAM to designate which of two memory portions or units therein will be utilized by the ladder word in question when a portion of the ladder memory word is transferred to the RAM memory during a line solving operation. In accordance with the direction provided by arrow 60A in the programming panel PP, the operator will be guided to normally open contact OUT 9, as shown in FIG. 2. The operator will enter this contact in a manner similar to the manner in which contact OUT 003 was entered. Contact OUT 009 represents the sixth ladder memory sequential word. There will be a digital 1 in the RETURN memory location, a digital 1 in the IN/OUT memory location and digital 1's in the "8" and "1" locations. By referring to FIG. 6, the updated partially constructed ladder diagram from FIG. 2 is shown once again. In addition, the indicating arrow 72 is provided. This arrow, as well as arrow 55A on the indicator portion 50 of the programming panel PP, guides the operator to the next contact to be entered in sequence. This contact is the normally opened contact OUT 1. This contact is entered in a manner similar to contacts OUT 003 and OUT 009. Contact OUT 1 represents the seventh sequential word in the ladder memory; and it contains a digital 1 in the IN/OUT location and a digital 1 in the "1" location. After the contact has been entered, the arrow 60A will illuminate to prompt the operator to search for the next contact for entry in the location occupied by the normally opened contacts IN 3 of FIG. 2. This contact has all three attributes associated therewith. Consequently, digital 1's will appear in the OPEN, UP and RETURN locations of "WORD 008" of the ladder memory sequential word. In addition, a digital 1 will be in the "2" location and in the "1" location. The prompting system will then lead the operator to contact OUT 13. This contact has both an OPEN and an UP attribute; and therefore corresponding digital 1's will appear in sequential "WORD 9" of the ladder memory. This word is designated OUT 013. Also, since this is an output word, a digital 1 will appear in the IN/OUT memory location. Finally, since the data designation for this word is 13, digital 1's will appear in the "8", "4" and "1" locations of the word 009 (the sum of 8, 4 and 1 is 13). The entry procedure will continue in a manner generally similar to that which has preceded. The prompting system in each case will direct the operator to the next contact to be entered. The words will be entered in the ladder memory LM in an appropriate sequence for subsequent efficient solution in the line solver LS. A typical solution sequence is indicated to the right in FIG. 10. The data designation for each word is shown to the left in FIG. 10. It will be noted that when the operator enters the word IN 006 for the second time that the data designation and the numerical designation in the eleven least significant bits will be the same. However, since this is a separate contact, its attributes may be different. In fact, contact IN 006 when entered the second time contains only an OPEN attribute; whereas, the contact when entered the first time contained only an UP attribute. The same applies for twice entered contact IN 003. The data designation in the eleven least significant bits is the same; however, the attribute data are different. In the first case, contact IN 003 had all three attributes; whereas the second entry of contact IN 003 had only the UP and RETURN attributes. By referring to FIGS. 7 and 8, the updated status of the partially contructed ladder diagram, as displayed on the readout device RD, is shown for two arbitrarily chosen milestones in the entry process. With regard to FIG. 7, the contruction up to and including the entry of the contact OUT 013 (WORD 009) is shown; and with respect to FIG. 8, the construction up to and including the entry of contact IN 013 (WORD 013) is shown. With regard to FIG. 7, it can be seen by the prompting line 74 that the operator is to search to the right of contact OUT 9 in the drawing of FIG. 2 to find the next contact for entry. An examination of FIG. 2 will show that this contact is IN 6, which, as mentioned previously, is entered twice. The dual entry of contacts IN 6 merely means that when the IN 006 switch of FIG. 1C is closed, the status of both of the contacts IN 6 will be affected simultaneously. That is to say, the operation or movement of one switch will cause a dual or parallel action in the ladder diagram. The same is true, of course, for the other dual entered contact IN 003. By referring to FIG. 8, it can be seen that after the ladder diagram of FIG. 2 has been partically entered, up to and including the contact designated IN 18, that the indicating arrow 76 indicates that the next place to look for a contact for entry is below the contact OUT 13. A perusal of FIG. 2 will show that the contact in question therefore must be contact OUT 15. The entry process proceeds as mentioned through the entry of the last contact OUT 13, which represents WORD 18 for the ladder memory sequence, as shown in FIG. 10. At this point, the operator will be advised or alerted by the prompting system to search for the next device for entry to the right of contact OUT 012. The operator will quickly determine that the next device for entry must be the solution coil or output coil OUT 81. Although this is designated as an output device, the operator will recognize that it is a special function output device in that it is not a set of relay contacts, but rather a coil to be actuated according to the status of the contacts preceding it to the left and their status. In order to enter the output coil OUT 81, the operator will depress the coil key 86 on the programming panel PP. This will place digital 1's in all of the first six memory locations to the left in FIG. 10. The first five digital 1's represent a special function and the next digital 1 represents an output device. The presence of five digital 1's in the first five memory locations to the left of FIG. 10 or in the ladder memory will indicate to the line solver LS and the random access memory RAM at a later time that a solution is imminent; and therefore, the line solver LS must be set up to provide output data to the sixteen bit data bus DB, for example. Regardless of the exact format of data entry into the programming panel interface PPI, it can generally be said that after an entire rung has been entered, which is represented by the entry of the nineteen sequential words shown in FIG. 10, the rung information should be shifted into the ladder memory in preparation for the entry of a new rung. FIG. 12 shows a completely entered rung in the readout device RD.

Referring once again to FIG. 2, it can be seen that the other complete rung shown therein includes a timer TMR, serially connected, normally open contacts OUT 12 and IN 13, which are connected to one input e of the timer, and serially connected normally opened contacts OUT 1 and IN 21, which are connected to the ENABLE terminal of the timer TMR. The timer TMR, in turn, drives a coil OUT 87. The timer TMR may operate in any number of well known ways, but for purposes of simplicity of illustration, it may be presumed that the output coil OUT 87 will be actuated at some time $\Delta t$ after the uppermost input terminal e of the timer TMR has been actuated. Actuation of the output terminal of timer TMR can only be caused by the closing of the serially connected contacts OUT 12 and IN 13. Furthermore, no action can take place unless the ENABLE terminal has been energized by the closing of the serially connected contacts OUT 81 and IN 21. The entry of the timer information into the ladder memory LM is schematically represented in FIG. 10 and identified as TIMER INFO. Digital information converning the four contacts OUT 12, IN 13, OUT 81, IN 21, and the output coil OUT 87 is shown. In addition, data concerning the length of time the timer TMR takes to time out are entered in the locations designated TMR ACC and TMR-PSET. The entry process for the first contact OUT 12 is similar to the entry process described previously with respect to other contacts. In a like manner, the entry process for the contacts OUT 81 and IN 21 is similar. The entry of contact IN 013 is slightly different in that the program panel PP is set up to automatically insert a digital 1 into the RETURN location for the contact IN 13. This occurs when the alphanumerically identified timer key TMR is depressed in the programming panel PP shown in FIG. 1C. The timer TMR performs the function of providing a line solver output at some predetermined time after certain conditions occur. Said in another way, the timer causes a time delayed output signal.

The programming panel PP may be cleared at this point and the programming panel PP and the readout device RD may be set up for the entry of the next complete rung of the ladder diagram.

Figure 13:
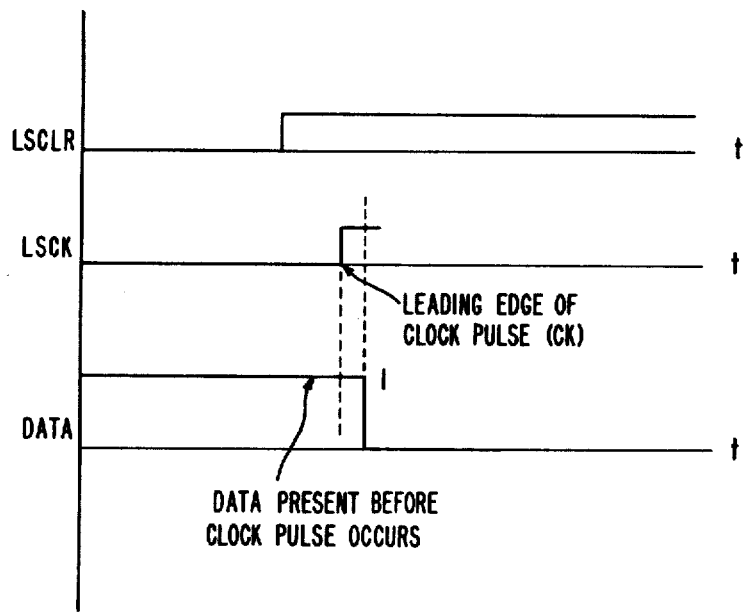
FIG. 13 shows the clear, clock and data pulse time relationships for the line solver of FIG. 1B.

Referring to FIGS. 1A, 1B, 13, and 14B, the interaction of signals on the clear LSCLR, clock LSCK and data inputs of the various devices of the line solver LS is shown. Referring to FIG. 13 specifically where one embodiment of the invention is illustrated, it is shown that the clear pulse LSCLR which is usually only utilized once per solution of one rung of ladder diagram, will occur before the clock pulse LSCK is applied to begin the solution. Furthermore, data need be present on the various data inputs of the various devices shown in FIG. 14B, for example, before the utilization of the clock pulse LSCK is effective. Said in another way, the leading edge of the clock pulse LSCK will cause appropriate actions to take place in the line solver LS, if the leading edge of the clock pulse LSCK occurs after data is present on the various devices. Generally, only one clock pulse need be supplied to the line solver LS for the solution of each contact or other device in the line solver LS. Generally, after the clock pulse has occurred, new data information will be supplied by internal portions of the line solver LS to other input terminals thereof and new information may be provided by external terminals thereto. The latter terminals may be terminals interconnected with the random access memory RAM or the ladder memory LM, for example. Once newly established data is present on the various input terminals, another clock pulse may be utilized to add the solution of another contact device into the accumulated solution.

Referring to FIGS. 1A through 1D and 11, the loading of the random access memory RAM in a manner consistent with the previously established example is shown. In this case, LOCATIONS "1" through "64" identified to the right in FIG. 11 each contain eight bits of information and represent the input data locations for the random memory unit 34 of FIG. 1A. Data associated with inputs will normally be stored in the latter portion of the random access memory RAM. On the other hand, LOCATIONS "65" through "112" represent the output locations. Data associated with outputs will normally be stored in these locations. Typically, for inputs, the "normal" status of a contact is represented by a digital 0 in the random access memory RAM; and the non-normal status of a contact is represented by a digital 1 therein. Consequently, if a switch is normally opened, but in its non-normal or closed state, as of the last sampling thereof, a digital 1 will exist in the location of random access memory RAM which represents that switch location. For outputs, a digital 1 represents the non-normal, energized state; whereas a digital 0 represents the normal, non-energized state. The bit numbers are shown across the top in FIG. 11 from "1" to "8", reading left to right. Each location has eight bits therein. It is in the "INPUT DATA LOCATIONS" 34 and the "OUTPUT DATA LOCATIONS" 36 of the image random access memory RAM of FIG. 1A that the actual or calculated status of the switch contacts and coils are stored. This data is purposely linked up with the serially stored data in the ladder memory LM at appropriate times for ladder rung solution. The solution is returned to appropriate parts of the random access memory RAM and eventually read out of the random access memory RAM to the actually output devices. At other appropriate times, the actual status of the input devices is read into the random access memory RAM. As can be seen, the random access memory RAM must performs various input and output operations, which is one of the reasons that access thereto is made random. At the start of a sampling cycle, input cards, such as ICARD 001, ICARD 002 and ICARD 003, shown in FIG. 1C, are sampled by the sampler distributor SD and fed back into the random access memory RAM by way of the input-output buffer 10B, the input-output interface IOI and a portion of the sixteen bit data bus DB to appropriate input locations in the random access memory RAM. Meanwhile, output locations 36, containing previous solutions of the line solver LS, remain in a readable state in another portion 36 of the random access memory RAM. At an appropriate time, the line solver LS is actuated to solve the various rungs of the ladder diagram by sequentially reading the data from the ladder memory LM word-by-word, thus choosing certain status locations randomly in the random access memory RAM and linking this data with ladder memory data to set input information on the various devices of the line solver LS. When the line solver solution has been made, the solution is fed back by way of the central processing unit CPU and the control bus CB, for example, through the SBO control terminal of the random access memory RAM to appropriate output locations in the random access memory RAM. Thereafter, the output locations 36 of the random access memory are sampled in groups or clusters and the clustered data is fed back by way of the sixteen bit data bus DB through the input-output interface IOI, the input-output buffer IOB and the sampler distributor SD to the output cards OCR. Some of the data which are stored in the output locations 36, although representing a solution by the line solver LS, actually provides input data for a subsequent line solver solution. This means that as data is poured out of the ladder memory LM in sequence, the status of an output signal may be sampled from the random access memory RAM by the line solver LS for solution. Normally the line solver LS looks for input data to determine the status of a contact it is to solve.

Figures 9, 11:
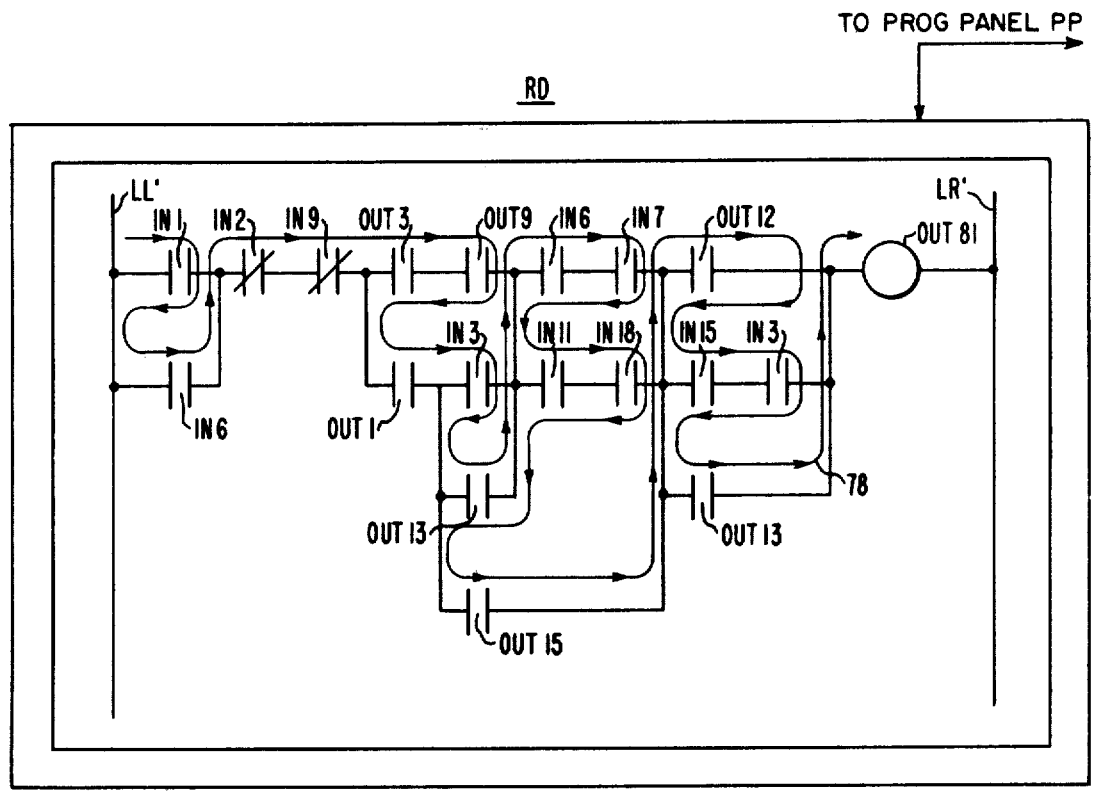
FIG. 9 shows a display for a ladder diagram entry apparatus prompting system for a final entry stage for the ladder diagram of FIG. 2.
FIG. 11 shows a graphical digital memory representation of the contact and coil status at a given instant of time for the input and output devices depicted schematically in the relay ladder diagram of FIG. 2 and electrically in the card arrangements of FIGS. 1C and 1D.

Referring to FIGS. 1B, 1D, 2, 9, 10 and 11, for example, when the line solver LS approaches the third sequential word WORD 003 of the ladder memory, it will recognize that the word is designated IN 2. Memory information stored in the eleven data locations to the right in WORD 003 will be utilized to set up an address in the input data locations 34 of the image random access memory RAM to ascertain the most recently sampled status of contact IN 002. It can be seen that this information is contained in the second bit of location 1 of the random memory unit 30 of FIG. 11. This data is then fed out by way of the SBR signal into the line solver LS for solution. On the other hand, one of the contacts to be solved by the line solver LS has the designation OUT 9. FIG. 2 shows a dummy coil having the representation OUT 9. An examination of the output cards of FIG. 1D will shown no corresponding real word output device having the designation OUT 9. The meaning of this is simple. The dummy coil OUT 9 does not exist in reality; but is merely utilized to show that the solution of the output coil OUT 9 of a previous rung provides updated input information for the solution of the coil in question in another rung. Consequently, when the ladder memory sequential word 006 is poured out of the ladder memory unit into the RAM unit for choosing contact status information for feeding into the line solver LS, the address provided by the ladder memory LM will cause data to be sampled in the output portion 36 of the random access memory—that is, data in LOCATIONS "65" through "112". It can be seen that the appropriate data in question comes from the first bit in LOCATION "66". This information, although designated ouput, is actually supplied as input data to the line solver LS. In another case, the output location may have an existing counterpart on the cards shown in FIG. 1D. Nevertheless, it can be still sampled as input information or contact status information for use by the line solver LS in solution of a subsequent rung of a ladder diagram. This is analogous to an actual relay coil having auxiliary contacts, some of which are used in the electrical solution of other rungs thereof. As was mentioned previously, the ladder memory LM is set up to distinguish this output data by a digital 1 existing in the IN/OUT bit of the ladder memory LM. When all of the contacts of the ladder diagram shown in FIG. 2 have been solved according to the sequence laid out by the continuous arrow 78 of FIG. 9, the status of the output coil OUT 81 is determined. At this time, that information is supplied to the TNP line driver of the line solver LS. From there, it is fed along one of the sixteen bit data bus lines DB through the central processing unit CPU and thence the control bus CB to be utilized as single bit input information on the line SBO for the output portion 36 of the random access memory RAM. At a later time, when the random access memory RAM has been set up to deliver coil status updating information to the cards shown in FIG. 1D, this information will be provided to an output card 001 (not shown). The location of the various status bits associated with the sequential entry information stored in the ladder memory of FIG. 10 is depicted in FIG. 11. It can be seen, for example, that inputs IN 1, IN 2, IN 3, IN 6 and IN 7 are all in LOCATION "1". On the other hand, output information, such as OUT 9, OUT 12, OUT 13, OUT 14 and OUT 15 is stored in appropriate bits of LOCATION "66". Although not shown in FIG. 11 for purposes of simplicity of illustration, input data IN 6, IN 11 and Output data OUT 1, OUT 13 and OUT 15 contain digital 1's rather than digital 0's in their RAM bit locations. This means that input device IN 1 is in its non-normal state, as is shown by the dotted line through the contact IN 6 of FIG. 2. The same can be said for contact IN 11. The digital 1's existing in the locations OUT 1, OUT 13 and OUT 15 represent devices that are or should be placed in the non-normal or energized state when the random access memory RAM is sampled for updating the output cards OCR shown in FIG. 1D. It will be noted that when the sequential ladder memory output data is fed out at WORD 002 and WORD 010 of FIG. 10, the same RAM data location IN 006, which is at the 6th bit of LOCATION "1" of FIG. 11, is sampled for providing data to the line solver LS. This eliminates having one RAM memory location for every auxiliary contact. There can be numerous auxiliary contacts represented by the data stored in the representative ladder memory of FIG. 10 and depicted as a ladder diagram in FIG. 2. As the auxilary contacts are utilized each time, the same location of the random access memory RAM is sampled for status updating.

Figure 14A:
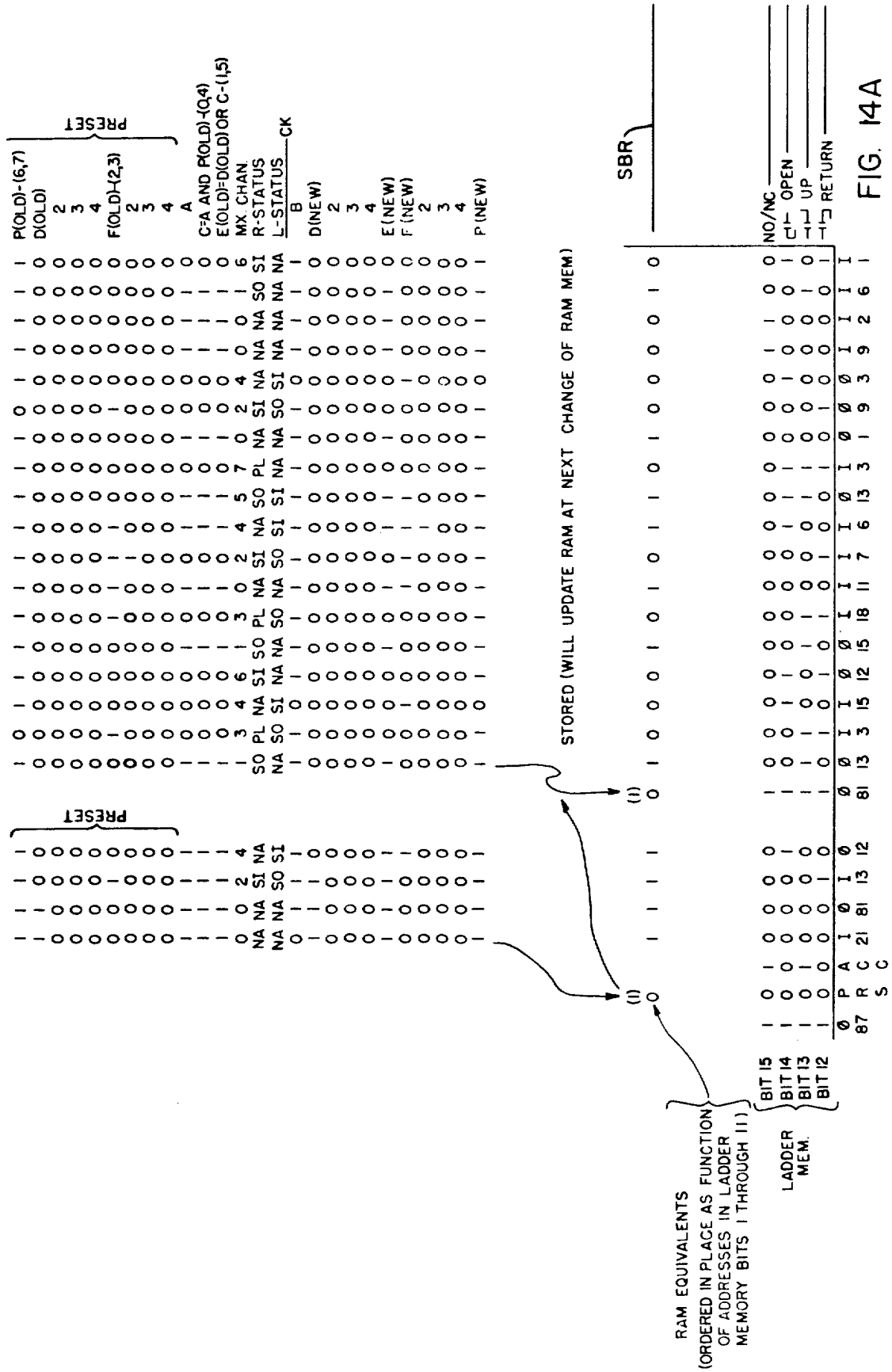
FIGS. 14A and 14B show a simplified version of the line solver of FIG. 1B with certain important points identified and with a corresponding map of important point values which occur in sequence during a solution of the ladder diagram depicted in FIG. 2.
Figure 14B:
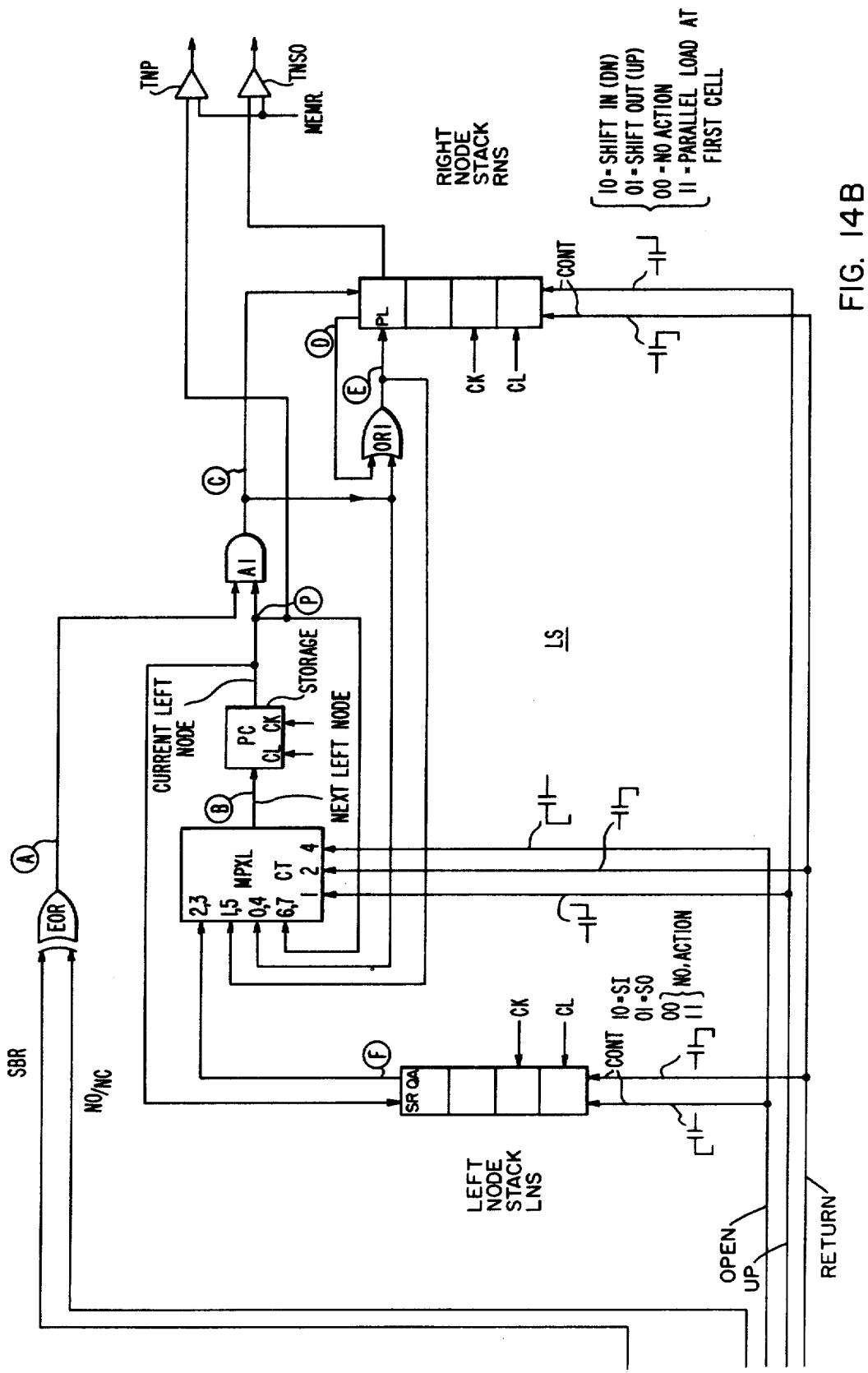

Referring to FIGS. 10, 11, 14A and 14B, a description of the operation of the line solver LS, as illustrated by using the previously stated non-limiting example of FIG. 2, is given. FIG. 14A shows a map of line solver points and their digital relationship one to another for each contact or coil in the example solution. Also shown is random access memory equivalent device status information which is ordered in place as a function of addresses in ladder memory bits 1 through 11, as previously described with respect to FIG. 10 and FIG. 11. Furthermore, a portion of the ladder memory limited to bits 12 through 15 or the second through fifth bits thereof as read from the left in FIG. 10 are shown. The RAM equivalents are shown as supplying input on the line SBR for one of the terminals of the exclusive OR gate EOR. Bit 15 of the ladder memory is shown as providing normally opened or normally closed information NO/NC to the other input of the exclusive OR gate EOR. Bits 12, 13 and 14 of the ladder memory are shown as providing control signals for the left node stack LNS, the multiplexer or selector MPXL and the right node stack RNS. The upper part of the map shown in FIG. 14A shows 16 rows of line solver entry information. The first nine rows in each case contain present entry information from the solution of the previous contact or coil, as the case may be. The next row shows the A solution, as depicted at the output of the exclusive or gate EOR in FIG. 14B. The next row shows the C solution as shown at the output of the AND gate A1 shown in FIG. 14B. The C solution is equal to the A solution and the previous P solution. The C solution is fed to input terminals "0" and "4" of the multiplexer MPXL. The next row shows the previous E solution which is the output of the OR gate OR 1. The E solution is equal to the previous D solution which is the value of the most recent cell of the right node storage stack RNS or the C solution as described previously. The E solution is provided to the "1" or "5" inputs to the multiplexer MPXL. The next row shows the multiplexer channel to be utilized in the present solution as determined by the status of the OPEN, UP and RETURN attributes as delivered from bits 12, 13 and 14 of the ladder memory LM. Row 14 shows the appropriate status for the right node stack RNS. Row 15 shows the appropriate status for the left node stack LNS. The latter two status situations are controlled by the dual control inputs on each of the stacks. The next row shows the B or multiplexer output status. The next row shows the new or recently solved D status which represents the sampled output cell of the right node stack RNS. The next three rows show succeedingly remote cells of the right node stack RNS. The next row shows the new E status; the next row shows the new F status, which is the output or most accessible cell of the left node stack LNS. The next three rows show the next three sequential cells of the left node stack LNS; and finally, the last row shows the newly calculated P status. It is to be presumed that rows 15 and 16 contain data separated in time by the presence of the leading edge of a clock pulse CK which updates the status of the various line solver LS points, thus producing the new values shown in rows 16 through 26. The value contained in row 1 of the next column for solution will be the value contained in the last row of the previous solution. The values contained in the next four rows of the new solution will be the values contained in rows 17 through 20 of the previous solution. The values contained in the next four rows of the next contact will be the values contained in the rows 22 through 25 of the previous solution. The contact identification has been shortened at this point to simplify the discussion, thus contact IN 001 will be I1 and contact OUT 13 will be $\phi$13. Before the first contact I1 (same as IN 001) is entered into the line solver in its proper sequence for solution, the clear terminals CL are pulsed to clear the line solver LS in preparation for the solution of a new rung. This is usually done by the placement of a digital 1 (by way of clear pulse LSCLR) on the clear terminal CL. The placement of a digital 1 on the clear terminal CL of the power transfer block or bi-stable storage device PC of the line solver LS places a digital 1 on its output at the "CURRENT LEFT NODE" or P output terminal. Since the input information for contact I1 contains an OPEN and a RETURN attribute, the shift register RNS will be in a shift-in (SI) mode. This is because a digital "1-0" exists on the control terminals CONT, as read from left to right in FIG. 14B. The left node storage LNS will be in a no-action mode because a digital "1-1" exists on the control terminals CONT as read from left to right in FIG. 14B. The multiplexer MPXL is set up to sample input "6" thereof because of the presence of the OPEN and RETURN attributes on input terminals "4" and "2" of the control terminals CT thereof. Since a digital 1 exists at the P terminal, a digital 1 will exist on multiplexer input "6", and since multiplexer input "6" is the one being samples, a digital "1" will exist on the B or output terminal thereof and this represents the power value for the next left node to be passed through the control flip-flop PC. Since the exclusive OR gate EOR has digital 0's on both its input terminals, the output or A point thereof will be at digital 0. Since the A point is digital 0, the C point or output of the AND gate A1 will be at digital 0. This means that the act of shifting into the right node stack RNS will not change the digital 0 in the first cell thereof. The left node storage or shift register LNS will not be affected. The new value of E which is D ORed with C will be digital 0 and the new P value will be the previous B value, which is a digital 1. At this point, the central processing unit CPU described with respect to FIGS. 1A through 1D will actuate the ladder memory LM and in turn the RAM memory to place the RAM equivalents and ladder memory bits for the next input 16 at appropriate places in the line solver LS. Since only the UP attribute is present, the right node stack RNS will be in a shift out mode, the left node stack LNS will be in a no-action mode and the multiplexer channel chosen will be No. "1". Prior to the occurrence of the clock pulse LSCK for the solution of contact I6, none of the cells of the right node stack RNS nor the left node stack LNS will have anything but digital 0's stored therein. The output A will be digital 1 because there is a digital 1 present from the RAM memory on one and only one of the inputs of the exclusive OR gate EOR. Since P is equal to digital 1 and A is equal to digital 1, the output of the AND gate A1 which is point C, is also equal to digital 1, which makes point E equal to digital 1. point E represents the signal on the "1" multiplexer channel. Since that is the channel being sampled by the multiplexer MPXL, the B output will have a digital 1 impressed thereon. When the clock pulse LSCK occurs, the digital 1 on the B output will be transferred to the P terminal and represent the new P value; the E value will remain digital 1; and none of the cells in either of the shift registers will contain a digital 1. At this point, the central processing unit CPU will cooperate with the ladder memory unit LM and the random access memory RAM to provide the input data for input 12 to the line solver LS. Since no attribute is present, neither the left node stack LNS nor the right node stack RNS will take action at the next clock pulse LSCK, and the multiplexer channel chosen will be "0", which is interconnected with the C output of the line solver LS, which is the output of the AND gate AI, which is at a digital 1 logic level because the output of the exclusive OR gate EOR or the A output is at a digital 1. This is due to the fact that the NO/NC input provided thereto is at a digital 1, while the other input thereto is at a digital 0. After the occurrence of the clock pulse LSCK, the digital 1 on the output B of the multiplexer MPXL will be transferred to the P output and represent the new P value. None of the cells of the storage devices LNS or RNS will have any digital 1's therein. Next, input 19 is solved. Since it has no attributes associated therewith, no action will be forthcoming from the left node stack LNS or right node stack RNS and the multiplexer channel once again will be "0". The "0" channel is interconnected with the C output, which is again digital 1 because the A output is digital 1 and the P output is digital 1. The A output is digital 1 because the NO/NC input terminal thereto is digital 1. After the occurrence of the clock pulse LSCK, the new P value will be digital 1 and no cell of the storage devices will have digital 1's therein. The next contact to be solved is output 03. The arrangement of the attributes is such that the fourth multiplexer channel will be chosen, the right shift register RNS will have no action associated therewith, and the left node shift register LNS will have a shift-in action taking place. The fourth multiplexer channel is interconnected with the C output, which is digital 0 because the A output is digital 0. At the occurrence of the clock pulse LSCK, the new P value will be digital 0; the F value or output of the first cell of the left node storage LNS will be digital 1 because a digital 1 had been shifted in from the previous P value. Consequently, the first cell of the left node stack LNS will have a digital 1 therein and the three remaining cells will have digital 0's therein. The next contact to be solved is designated 09 at the bottom of FIG. 14A. Since the only attribute associated with 09 is a RETURN, the multiplexer channel will be set up to pass the information on input "2" thereof to the output B thereof. Since input "2" reads the output cell of the left node stack LNS or terminal point F, and since this point was previously set up to contain a digital 1, a digital 1 will exist on output B or the "NEXT LEFT NODE" of the line solver LS. Furthermore, the right node stack RNS will be set up to shift-in whatever input is on line C. In addition, the left node stack LNS will be set up to shift-out the information contained therein. Consequently, after the occurrence of the clock pulse LSCK, the new value for P will be digital 1 from the previous value for B. The new value of D will be digital 0. The new value for F will be digital 0, as the digital 1 contained in the first cell of the left node stack LNS has been shifted out. In this case, the value for E (new) will also be digital 0. The next contact to be solved will be relay contact 01 (OUT 001). It has no attributes; therefore, neither the left node stack LNS nor the right node stack RNS will change. Multiplexer channel "0" will be read. This channel is connected to the C terminal or the output of the AND gate A1. Since C is equal to the value of A and the previous value of P, and since A's value is digital 1 and P's value is digital 1, C's value will be digital 1. Since C's value is digital 1, the value for E will be digital 1. Also, the new value of B will be digital 1 since that is what is passed through the multiplexer from input channel "0". After the occurrence of the clock pulse LSCK, neither the left node stack LNS nor the right node stack RNS will have changed status because no action will have taken place. The new value of P will be digital 1 as passed through the power flip-flop PC from the B terminal. The new value OF E will also be digital 1 as the new value of C remains digital 1 since the digital 1 on the line A has not changed, and the previous digital 1 at P was replaced by another digital 1. The next contact to be solved will be 13 (IN 003). It has all three attributes, namely, OPEN, UP and RETURN. Consequently, multiplexer channel "7" will be chosen; the right node stack RNS will perform a parallel-load operation; and the left node stack LNS remains unchanged. In the parallel-load operation, the previous value on E will be shifted into the first cell of the right node stack RNS without affecting the status of any of the other three cells thereof. Since multiplexer channel "7" is chosen, a digital 1 will be present at the output terminal B of the multiplexer MPXL because a digital 1 is present at location B. Terminal A or the output of the exclusive OR gate EOR will be digital 0 since both of its inputs are digital 0. Terminal C will also be digital 0 since output A is digital 0. Terminal E or the output of the OR gate OR 1 will be digital 0 since terminal C is digital 0, and the output D is at digital 0. Consequently, on the occurrence of the clock pulse LSCK, a digital 0 will be shifted into the first cell of the right node storage stack RNS. Consequently, no effective change will occur in the right node stack RNS. The digital 1 at terminal B will be transferred to the "CURRENT LEFT NODE" terminal or output terminal P of the power transfer flip-flop PC. Consequently, the new value for terminal P will also be digital 1. The next terminal to be solved will be output 013 (OUT 013) which has the attributes OPEN and UP. This will set up the multiplexer MPXL so that channel "5" is sampled and will set up the right node storage RNS so that a shift-out will occur therein, and will set up the left node storage LNS so that a shift-in will occur therein. One of the inputs to the exclusive OR gate EOR is digital 1 and the other is digital 0; consequently, the value of A is digital 1. Since that value is digital 1, and the value of P is digital 1, the output of the AND gate A1 or the C value is also digital 1. Since the C value is digital 1, the output of the OR gate OR 1 or the E value will also be digital 1. Since channel "5" of the multiplexer measures the E value, the output of the multiplexer MPXL or the terminal B will contain a digital 1. After the occurrence of the clock pulse LSCK, all cells of the right node storage RNS will contain digital 0's; the value of E will remain digital 1 because the value of C remains digital 1 because the value of A is digital 1. The new value for P is digital 1. The next contact to be solved will be contact 16 (IN 006) which contains only the OPEN attribute; therefore input channel "4" of the multiplexer MPXL will be chosen. The right node storage stack RNS will perform no-action and the left node storage stack LNS will perform a shift-in or "push" operation from the P terminal. The contact in question is normally open, but is now in its non-normal state or closed state. Consequently, the output of the exclusive OR gate EOR is digital 1. Since the previous value for P is also digital 1, the output of the AND gate A1 will be digital 1 and the output of the OR gate OR 1 will be digital 1. Multiplexer channel "4" reads the output of the AND gate A1 or the C terminal. Since this is digital 1, the output of the multiplexer MPXL or the B terminal is digital 1. At the occurrence of the clock pulse LSCK, the right node storage stack RNS will remain unchanged; the left node storage stack LNS will shift another digital 1 in, thus storing digital 1's in both of the first two cells thereof and digital 0's in the remaining cells thereof. The E terminal will be digital 1 because the C terminal remains digital 1 because the new value of the P terminal is also digital 1. At this point, the left node storage LNS contains two digital 1's in the first two cells. The next contact to be read is I7 (IN 007). It has the RETURN attribute; therefore, multiplexer channel "2" will be chosen. The right node stack RNS will have the input thereto shifted-in or "pushed"; whereas, the left node stack LNS will have the first digital 1's thereof shifted out or "popped". The contact I7 is normally opened and is in its normal state; therefore, the output of the exclusive OR gate EOR or the A terminal is digital 0 Therefore, the output of the AND gate A1 or the C terminal is digital 1, regardless of the status of the P terminal. The output of the OR gate OR 1 or the E terminal is digital 0 because both the C terminals and D terminals are at digital 0. The second channel of the multiplexer reads the first cell of the left node stack LNS, thus placing a digital 1 at the B location. At the occurrence of the clock pulse LSCK, all cells in the right node storage RNS will remain digital 0; the new value of E will remain digital 0 because the new value of C will remain digital 0 because the previous value for A has not changed. The new value for F will remain digital 1, but the second, third and fourth cells will now have digital 0's therein as one of the digital 1's has been shifted out or "popped". The new value of P will be digital 1.

The line solver LS will iterate in sequence in a manner similar to that described previously through the solution of contacts I11, I18, 015, 012, I15, I3 and 013. The contact 013 is the last contact to be solved before the output coil 81 is determined. The existence of five digital 1's in the five data blocks to the left in FIG. 10 for coil output φ81 (OUT 081), which incidentally comprises WORD 019 as shown to the right in FIG. 10, signifies that a coil is now being operated on by the line solver LS. This alerts the central processing unit CPU to send a signal along the sixteen bit address bus AB to the output determining circuit OC of the line solver LS to place a digital 1 on one input terminal of OR gate OR 2 as shown in FIG. 1B. Concurrently, a memory read signal MEMR is supplied by way of the control bus CB of the central processing unit CPU to the other input terminal of the OR gate OR 2. Thus, both of the output line drivers TNSO and TNP of FIG. 1B are enabled to provide outputs to various lines of the 16 bit data bus DB. The actuated or enabled line driver TNP interconnects with the solution containing the P terminal of the line solver LS with the data bus DB. An examination of the map of FIG. 14A will show that the value of P at this time is digital 1. According to the apparatus of FIGS. 1A and 1B a digital 1 is provided to the appropriate line of the 16 bit data bus DB and routed to the central processing unit CPU. This digital 1 is fed from the central processing unit CPU by way of the control bus CB as the BW signal. The occurrence of the next SBO signal will therefore cooperate with element 38 of the random access memory RAM of FIG. 1A to route signal BW by way of element 42 into the output data locations 36 of the random access memory RAM. The address in memory location 36 is determined by the 16 bit data line address decoder 24 which is interconnected with the RAM address control 23 to choose the proper location in the memory for placing the information on the BW line as shown in FIG. 1A. As FIG. 11 indicates the value of digital 1 for the BW signal OUT 81, recently arrived at by the line solver LS through its iterative contact solution process, will be stored in the first bit location to the left in location 75 for output data locations 36 of the random access memory RAM. This in effect places a digital 1 in the OUT 81 compartment. Consequently, at a later time when this particular compartment or bit is read either for updating the actual status of the coil associated with the OUT 81 function or for determining other contact status based on the status of output 81, it will indicate that the status of that contact or coil is in the energized or "1" state. It will be noted that previous to this solution of coil 81, OUT 081, a digital zero had resided in the latter mentioned bit of location 75. Thus the new value represents a change.

The previously described illustrative process shows how the line solver LS and the various peripheral memory and interfacing portions of the programmable controller PC operate to simulate a solution of a ladder rung for energization a coil. This is done without requiring the actual hard wiring of the circuitry to perform the function. The function is performed rapidly and continuously within the programmable controller PC in relationship to the actual statues of switches and coils. No interconnection between the switches and coils in the traditional ladder diagram sense is necessary for the solution to take place and for the coils and switches and various other input and output devices to assume the proper status after solution.

Referring once again to FIGS. 14A and 14B as well as FIG. 2, FIG. 11 and FIGS. 1A through 1D it will be noticed that to the left of FIG. 14A mapped entry information concerning the solution of the second rung of the ladder diagram, referred to as the timer rung, is set forth. Although the ladder diagram rung as visualized in FIG. 2 appears to have unusual characteristics in that a timer device TMR is fed by two separate input lines the programming procedure used previously places input information into the various memories in such a fashion that the line solver recognizes the correct solution process. In particular, contact 012 (OUT 12) is solved first, then contact I13 (IN 013) is solved. If the status of the serial connection of these two contacts is such as to actuate the timer TMR, then contact 081 (OUT 81) and contact I21 (IN 021) are solved to enable timer TMR. This is equivalent to having digital 1's placed on input terminal e, and the ENABLE terminal of the timer TMR. That is to say that an enabled timer TMR is actuated at its actuating terminal e to provide an actuating signal at its output terminal for thus actuating the coil OUT 87. It will be noted that the third contact to be solved, OUT 81, is related to the output coil solved in the previous example. A digital 1 now exists in its specific location in the random access memory RAM as was described previously and that digital 1 will now be sampled appropriately to cause a proper actuation of the timer controlled output coil OUT 87. The line solver LS is preset as was the case previously to clear all shift registers and to place a digital 1 on the output of the power transfer flip-flop PC at the terminal P. Since contact 012, has the OPEN characteristic, multiplexer channel "4" will be sampled. Multiplexer channel "4" is interconnected with the C terminal or the output of the AND gate A1. The output of the AND gate A1 will provide a digital 1 at the C terminal if the D terminal and the A terminal have digital 1's thereon. The A terminal will have a digital 1 thereon if the contact is either normally closed, as is represented by the presence of a digital 1 on the normally closed, normally opened input line NO/NC, or is normally opened but in its non-normal state as is represented by the presence of a digital 1 on the RAM equivalent terminal. In the present example it is presumed that all the contacts 012, I13, 081, and I21 are in their closed state. In the present case it can be seen that the output of the multiplexer or the B terminal is a digital 1 since the input thereto or the C terminal is a digital 1. The net effect is to make the value of the P terminal after the occurrence clock pulse LSCK, equal to digital 1. This means that power will pass through the relay contact 012. Next, the relay contact I13 is examined. This is also a normally opened contact but is in its non-normal or closed state and consequently the A value will be digital 1 which will make the C value digital 1 because the P value is also digital 1. Multiplexer channel "2" is chosen. Channel "2" is at a digital 1 because it monitors the F terminal which in turn represents the first cell of the left node storage stack LNS which in turn was updated to a digital 1 status with the shifting in or "push" operation of the data on the P terminal during the last contact (012) solution. The right node stack RNS is set up to shift in the digital 1 from the C terminal. The left node status LNS is set up to shift out the digital 1 to the F terminal. Consequently, the new value of E will be digital 1 and the new value of F will be digital 0. The remaining cells of both the left node storage LNS and right node storage shift registers RNS will be digital 0. The value of P will be digital 1. Next, contact OUT 081 is monitored, and since it has recently been determined to be energized, a digital 1 exists on the RAM equivalent terminal thereof, thus placing a digital 1 on the A terminal which places a digital 1 on the C terminal which places a digital 1 on the E terminal. Multiplexer channel "0" is chosen and neither of the storage shift registers LNS or RNS are affected. Multiplexer channel "0" measures the value at C which is digital 1; consequently the value for B is digital 1. The new value of E remains digital 1. The value for D remains unchanged at digital 1 and the value for F remains unchanged at digital 0. The new value of P is therefore digital 1. Finally, the input I21 is solved. There is no action for either of the shift registers. The multiplexer channel chosen once again is "0" which reads the C output terminal. After the clock pulse LSCK the new value of P once again is determined to be digital 1. At this point the central processing unit CPU is alerted to check the timing values stored in the locations ACC, (TMR ACC) and PRS, (TMR-PSET) of the ladder memory LM. Therefore after a period of time when the new value of P has attained a 1 value, the central processing unit CPU will be alerted to read the D output of the right node storage RNS by way of the enabled line driver TNSO. This provides information for energizing the output coil 87 with a digital 1 in accordance with the timing values set up previously. This therefore provides the time delayed ON function or OFF function as the case may be. The foregoing illustrative example therefore shows a typical processing function for two types of rungs for ladder diagrams namely: standard coil, and timer activated coil.

Referring to FIG. 15, FIG. 14B and FIG. 1B a depiction of the line solver LS from a simplified viewpoint is shown. The various identifying points A through F and P are depicted, but for purposes of illustration the layout of the various portions of the line solver is shown differently in FIG. 15 than in FIG. 14A for clarity of illustration. Using FIG. 15 as a basis, to the left is shown a SELECTOR which corresponds to the multiplexer MPXL of FIG. 14B. The output of the multiplexer MPXL is fed to a BI-STABLE STORAGE DEVICE PC which corresponds to the power transfer flip-flop PC of FIG. 14B. The interconnecting conductor between the output of the SELECTOR and the input of the BI-STABLE STORAGE DEVICE is identified as point B and represents the status of the left node of the next contact to be processed by the line solver LS. The output of the BI-STABLE STORAGE DEVICE, or point P, represents the status of the left node of the present contact being solved by the line solver LS. Consequently it can be seen that the stepping action or the clocking action of the line solver LS transfers the future left contact which is on the input of PC to to the present left contact which is on the output of PC. The P value is provided concurrently to three different places. The first place is the "6" and "7" input terminals of the SELECTOR, which terminals are identified as the value of the present left node. The P output is also provided to the input cell of an N cell shift register or storage means which can be conveniently identified as the left node stack or shift register LNS. The input data provided at point P will be shifted into the left node stack LNS if a "1-0" is provided to the control terminals CONT (as read from left to right) of the left node stack LNS. Once this value has been shifted in or "PUSHED" it immediately appears on the F or output terminal of the left node stack LNS and from there it is provided to the "2" and "3" input terminals of the SELECTOR. The "2" and "3" input terminals represent the stored value of a left node. The value in the left node stack LNS can be shifted out or "POPPED" by apply a "0-1" to the control terminals CONT (as read from left to right) of the left node stack LNS. The P terminal is also provided as one input to an AND gate A1. The other input to the AND gate A1 is identified by the symbol A and is the output of an exclusive OR gate EOR. One input terminal of the exclusive OR gate EOR measures the normally opened and normally closed status NO/NC of the contact being solved by the line solver LS. The other input terminal of the exclusive OR gate EOR is interconnected with the random access memory RAM to read line SBR to determine on a periodically updated basis whether the present contact is in its normal state or its non-normal state. This of course is determined periodically by sampling the input cards ICR which are interconnected with the actual switch devices. If either one or the other of these values, but not both, is at a digital 1 then the output of the exclusive OR gate EOR, the A terminal, is at a digital 1 signifying that the contact is in a state to pass power therethrough. If the contact is in a state to pass power therethrough, and if there is power available to pass through as indicated at terminal P the output of the AND gate A1 or the value on terminal C will show power at the right node of the present contact. Consequently, terminal C may be identified as that terminal which gives the status of the right node of the present contact. Its value is provided simultaneously to three different locations. The first location is to the "0" and "4" input terminals of the SELECTOR. The second location is the input of a second shift register or right node stack shift register RNS. The control of shift-in (PUSH) and shift-out (POP) is the same as for the left node stack LNS, that is "1-0" on the control terminals CONT shifts the value of the C terminal into the shift-register and "0-1" shifts it out. If the value is in the shift register RNS it is sampled by the D terminal and provided as an input to the OR gate OR1. Consequently, the output E of the OR gate OR1 will always be the value of the D terminal if the D terminal is at digital 1. Output E is supplied to the "1" and "5" terminals of the SELECTOR which represent a stored value of the present right node. Third, the C output is provided directly to the other terminal of the OR gate OR1. Consequently if there is a digital 1 on the C terminal the "0", "1", "4" and "5" terminals of the SELECTOR must have digital 1's thereon. The output of the OR gate OR1 is also fed back to the parallel load input of the right node stack RNS. The right node stack RNS has the additional control function of parallel loading from the output of the OR gate if a "1-1" exists on the control terminals CONT (as read from left to right) thereof. The SELECTOR has three input control terminals numbered "1" for up, "2" for return and "4" for open. Consequently, it can be seen that there are 8 statuses that the line solver LS can assume during any line solving operation (see Table 1 once again). A first status occurs when all of the control inputs CT are at digital 0. This means that the "0" data input terminal of the SELECTOR is provided as to output terminal thereof and it also means that the left node of the next contact to be solved represents the right node of the contact presently being solved. This information comes from the output of the AND gate A1 and there will be no operations provided on the shift registers RNS or LNS. If only an UP is present on the control input, then the "1" data terminal of the DIRECTOR is sampled, and this is the output of the OR gate OR1. This will provide as an output of the SELECTOR a stored value of the right node of the presently solved contact or the present value of the right node of the presently solved contact. Furthermore, the "0-1" on the control terminal CONT of the right node stack RNS will shift information out of that stack. If the RETURN signal is the only control signal present, then the "2" data terminal of the SELECTOR will be sampled. That terminal is interconnected with the C output terminal of the AND gate A1 which means that the status of the right node of the present contact will be the status of the left node of the next contact. This also provides a shift-out function for the left node stack LNS and a shift-in function for the right node stack RNS. If only both the UP and RETURN control signals are present, then the third terminal of the SELECTOR will be provided to the output. This means that a previously stored value for a left node will become the value of the left node of the next contact to be solved. This information comes from the F terminal or the output of the left node stack LNS. The control signals CONT to the left node stack LNS will be such that a shift-out action will take place therein. The control function of the right node stack RNS will be such that a parallel-load action will take place, which means the digital signal on the output of the OR gate OR1 will be fed back into the right node stack RNS to change only the data in the first cell of the right node stack RNS without affecting any other data or information stored in the right node stack RNS. If there is a digital 1 on the E terminal or the output of the OR gate OR1, then a digital 1 will be shifted into the first cell of the right node stack RNS which will in turn be sampled by the D terminal which in turn will be provided to one input of the OR gate OR1. On the other hand, if a digital 0 is on the E terminal of the OR gate OR1 a digital 0 will be shifted into the right node stack RNS to be sampled by the D terminal to put the digital 0 on one of the inputs of the OR gate OR1. If the OPEN signal is the only one present the "4" control terminal of the SELECTOR or multiplexer MPXL will be actuated and therefore the fourth data input terminal of the SELECTOR will be sampled at the output thereof. The fourth input terminal is interconnected with the C terminal and represents the present right node. Consequently, the status of the left node of the next contact to be solved will be the status of the right node of the present contact. This will also cause a shift-in for the left node stack LNS but no action for the right node stack RNS. If both the OPEN and the UP control signals are present, then the fifth input terminal of the SELECTOR will be sampled and consequently the status of the left node of the next contact to be solved will be the status of the right node of the present contact being solved or the status of a stored right node of the previous contact. This set of control signals will also cause a shift-out in the right node stack RNS and a shift-in in the left node stack LNS. If the OPEN and RETURN control signals are both present, then the sixth input terminal of the SELECTOR will be sampled. This represents the P terminal of the line solver LS. This means that the status of the left node of the next contact to be solved will be the status of the left node of the present contact being solved. This set of control signals will also cause a shift-out of the left node stack LNS and a shift-in of the right node stack RNS. Finally, if all three control signals are present, then the seventh input terminal of the SELECTOR will be sampled. This represents the P terminal of the line solver LS. In this case, however, there will be no action made with regard to the left node stack LNS, but the right node stack RNS will have a parallel load action as described previously. The previously described eight control situations are the only ones which exist for the line solver LS as presently constructed. However, it is to be noted that the input values of the exclusive OR gate EOR may change independent of the value of the control signals and, depending upon which control signals have previously occurred, the values stored in the right node stack RNS and left node stack LNS may differ. Both the right node stack RNS and the left node stack LNS have the capability of shifting input data from the C or P terminal as the case may be into the various cells of the shift registers in sequence one at a time or shifting the data out in sequence one piece at a time. Furthermore, the right node stack RNS has the additional capability of loading the first cell thereof in parallel independent of the status of the other cells. At times the left node stack and right node stack LNS and RNS respectively are called LIFO devices, i.e. LAST IN FIRST OUT. The various elements labeled "EOR", "MPXL" ('DIRECTOR'), "A1" and "OR1" constitute "RANDOM LOGIC". Their function is to steer the 3 attributes to the control inputs CONT of the two shift registers and to route data between the shift register and the BI-STABLE STORAGE DEVICE. Other devices such as ROMS (read only memories) and PLA's (PROGRAMMABLE LOGIC ARRAYS) can also accomplish these control and routing functions. The ROM and PLA devices have an orderly (hence-"NONRANDOM") internal structure which facilitates their manufacture in the form of an integrated circuit. They are commonly used as replacements for "RANDOM LOGIC" where cost justified. The control and routing logic can be any combinatorial logic elements which correctly sequences and present data to the stacks (LNS and RNS) as a function of the attributes.

It is to be understood with respect to the embodiments of the this invention that the ladder memory unit diagram shown in FIG. 10, for example, is not limiting but is merely presented for the purpose of illustration. The specific arrangement of the address number, special functions, attributes and contact open or close status is non-limiting. It is also to be understood that the size of the ladder memory and the size of the random access memory as well as subdivisions of each is not limiting except by the availability of memory units which can accomplish the purpose desired. It is also to be understood that computer software is not a part of the claims of the present invention. It is also to be understood that the illustrative ladder diagram shown in FIG. 2, for example, is merely presented for the purpose of clarity of illustration and is not limiting except to the extent described herein elsewhere. It is also to be understood that memory units described herein, such as the ladder memory or the random access memory or the central processing unit, may be all contained within one central memory unit as separate subdivisions thereof or may be separately interconnected memory units. It is also to be understood that the utilization of the input/output cards is not limiting and any suitable method may be utilized for receiving information from external devices and delivering information thereto for actuating external devices. It is also to be understood that the illustrative digital map shown in FIG. 14A, for example, is not limiting but is merely presented for the purpose of clarity and completeness of illustration. It is also to be understood that the special functions described herein need not be utilized in all cases. It is also to be understood that the particular mode of logic described herein is not limiting; for example, digital ones may replace digital zeros and vice versa provided the associated hardware is adapted to compensate for the obvious logic reversal. It is also to be understood that the entry apparatus is not limited to a keyboard operation.

the apparatus taught with respect to the embodiments of this invention has many advantages. One advantage lies in the fact that a relatively complex rung of a ladder diagram may be entered by way of a programming panel into the memory of a line solver by using a relatively small number of line solver programming panel key manipulations and correspondingly a relatively small number of memory locations for accommodating the entire ladder diagram. Another advantage lies in the fact that the apparatus taught herein is conducive to ladder diagram memory entry by an operator whose level of skill may be less than that required by the prior art. Furthermore, with the present apparatus high speed of execution is obtained in the processing of the ladder diagram within the programmable controller.

I claim:
1. A programmable controller for solving a ladder diagram, comprising:
   (a) memory means for having the contacts of said ladder diagram stored therein in a representative form;
   (b) programming means interconnected with said memory means for entering said contacts of said ladder diagram into said memory means in said representative form, comprising:
      (i) first entry means usable for establishing in said memory means a condition precedent for representing a left node-to-left node interconnection between a subject contact and a yet unentered contact;
      (ii) second entry means usable for establishing in said memory means a condition precedent for representing a right node-to-right node interconnection between a subject contact and a yet unentered contact, and usable for representing in said memory means the interconnection of the left node of the next entered contact with the left node of a previously entered contact for which a condition precedent for representing a left node-to-left node interconnection had been previously established in said memory means;
      (iii) third entry means usable for representing in said memory means the interconnection of the right node of a subject contact with the right node of a previously entered contact for which a condition precedent for representing a right node to-right node interconnection had been previously established; and
   (c) ladder diagram solving means interconnected with said memory means for utilizing said ladder diagram as stored in said memory means for solving said ladder diagram and for providing an output related to the solution.

2. The combination as claimed in claim 1 wherein said first entry means, said second entry means and said third entry means are usable to enter said ladder diagram into said memory means in a predetermined sequence, said predetermined sequence being such as to allow said ladder diagram solving means to solve said representative ladder diagram one contact at a time.

3. The combination as claimed in claim 1 wherein said memory means comprises a digital memory of N words with X bits per word.

4. The combination as claimed in claim 3 wherein said establishment in said memory means of said condition precedent for representing said left node-to-left node interconnection, and said condition precedent for representing said right node-to-right node interconnection, and said representation of said interconnection of said left node of said next entered contact with said left node of a previously entered contact, and said representation of said interconnection of said right node of said subject contact with said right node of a previously entered contact is accomplished in only one of said N memory words.

5. The combination as claimed in claim 3 wherein X comprises 16.

6. The combination as claimed in claim 1 wherein said programming means comprises a programming panel with movable keys.

7. The combination as claimed in claim 6 wherein said first entry means comprises a programming panel OPEN key.

8. The combination as claimed in claim 6 wherein said second entry means comprises a programming panel RETURN key.

9. The combination as claimed in claim 6 wherein said third entry means comprises a programming panel UP key.

10. The combination as claimed in claim 1 wherein said ladder diagram solving means solves said ladder diagram one contact at a time.

11. The combination as claimed in claim 1 wherein said ladder diagram solving means solves said ladder diagram digitally, a clock pulse being provided in said latter diagram solving means, said ladder diagram solving means thus solving a contact at the occurrence of said clock pulse.

12. The combination as claimed in claim 1 wherein said memory means comprises a random access memory (RAM).

13. The combination as claimed in claim 1 wherein said memory means comprises a random access memory (RAM) for storing said ladder diagram and also comprises a contact status memory means with sequentially addressed locations for storing the periodically updated conduction status of each of the actual contacts of said ladder diagrams one per said addressed location.

14. The combination as claimed in claim 13 wherein said random access memory contains in a single word thereof one address location of said contact status memory and said representative form of one contact of said ladder diagram as entered by any combination of the actuation of said first entry means, said second entry means and said third entry means, said random access memory when actuated to read out data providing said representative form of said ladder diagram to said ladder diagram solving means and providing said address location to said contact status memory means for thus actuating said contact status memory means to provide the conduction status of the appropriate actual contact of said ladder diagram to said ladder diagram solving means so that said ladder diagram solving means may solve said contact.

15. The combination as claimed in claim 1 wherein said programming means comprises fourth entry means usable for establishing in said memory means a condition precedent for representing the interconnection of the right node of a subject contact and the left node of the next entered contact.

16. A programmable controller for solving a ladder diagram, comprising:
  (a) digital memory means arranged in X bits per words;
  (b) programming means for entering one contact of said ladder diagram into one word of said digital memory means by utilizing a combination of the attributes UP, OPEN and RETURN and an appropriate contact address; and
  (c) solving means interconnected with said memory means for solving said ladder diagram by utilizing words stored in said digital memory means.

17. The combination as claimed in claim 16 wherein X comprises 16.

18. A method for utilizing program entry apparatus for loading the memory of a programmable controller which is utilized to solve a ladder diagram one contact at a time comprising the steps of:
  (a) placing in said memory a condition precedent for representing a left node-to-left node interconnection between a subject contact and a yet unentered contact;
  (b) placing in said memory a condition precedent for representing a right node-to-right node interconnection between a subject contact and a yet unentered contact, and representing in said memory the interconnection of the left node of the next entered contact with the left node of a previously entered contact for which a condition precedent for representing a left node-to-left node interconnection had been previously established in said memory; and
  (c) representing in said memory means the interconnection of the right node of said subject contact with the right node of a previously entered contact for which a condition precedent for representing a right node-to-right node interconnection had been previously established.

19. Apparatus for solving the rung of a ladder diagram, comprising:
  (a) bi-stable storage means for indicating at the output thereof the electrical power status of an input node of a subject device in said latter diagram;
  (b) conduction status means, the input of which is interconnected with said bi-stable storage means output for simulating the conduction status of said subject device and for thus indicating at the output of said conduction status means the electrical power status of an output node of said subject device;
  (c) input node storage means, the input of which is interconnected with said bi-stable storage means output for storing the electrical power status of said input node as a function of an interconnection attribute of the next subject device to be operated upon;
  (d) output node storage means, the input of which is interconnected with said conduction status means output for storing the electrical power status of said output node as a function of an interconnection attribute of said next subject device to be operated upon;
  (e) selector means interconnected at separate inputs thereof with the outputs of said output node storage means, the output of said input node storage means, the output of said bi-stable storage means and the output of said conduction status means for thus choosing for the output of said selector means the power status present on one of said separate inputs, said choice being a function of an interconnection attribute of said next subject device to be operated upon, said output of said selector means thus representing the electrical power status of an input node of said next subject device, said output of said selector means being interconnected with the input of said bi-stable storage means for transferring said input node of said next subject device therethrough upon command to said output of said bi-stable storage means; and
  (f) attribute means interconnected with said input node storage means and said output node storage means and said selector means for providing said interconnection attributes thereto.

20. The combination as claimed in claim 19 wherein said subject device comprises a relay contact wherein said input node comprises one terminal of said relay contact and said output node comprises another terminal of said relay contact.

21. The combination as claimed in claim 19 wherein said attribute means is programmable to indicate the presence or absence of the following three attributes of each said device to be operated upon during the solution of said rung: UP, OPEN, RETURN.

22. The combination as claimed in claim 21 wherein the sequence of entry of said attributes into said attribute means to program said attribute means determines the sequence of solution of said rung.

23. The combination as claimed in claim 20 wherein said attribute means is programmable to indicate the presence or absence of the following three attributes for each of said relay contacts to be operated upon during the solution of said rung: UP, OPEN, RETURN, the sequence of entry of said attributes into said attribute means to program said attribute means determining the sequence of solution of said rung.

24. The combination as claimed in claim 19 comprising OR means one input of which is interconnected with said output of said output node storage means and another input of which is interconnected with said output of said conduction status means, said output of said OR means being connected back to a second input of said output node storage means, an input of said selector means thus being interconnected with said output of said output node storage means through said OR means.

25. The combination as claimed in claim 24 wherein said subject device comprises a relay contact wherein said input node comprises one terminal of said relay contact and said output node comprises another terminal of said relay contact.

26. The combination as claimed in claim 24 wherein said attribute means is programmable to indicate the presence or absence of the following three attributes of each said device to be operated upon during the solution of said rung: UP, OPEN, RETURN.

27. The combination as claimed in claim 26 wherein the sequence of entry of said attributes into said attribute means to program said attribute means determines the sequence of solution of said rung.

28. The combination as claimed in claim 25 wherein said attribute means is programmable to indicate the presence or absence of the following three attributes for each of said relay contacts to be operated upon during the solution of said rung: UP, OPEN, RETURN, the sequence of entry of said attributes into said attribute means to program said attribute means determining the sequence solution of said rung.

29. The combination as claimed in claim 28, wherein: said input node storage means is controlled as a function of said OPEN and said RETURN attributes, said output node storage means is controlled as a function of said RETURN and said UP attributes and said director means is controlled as a function of all three of said attributes.

30. A programmable controller for solving a planar graph, comprising:
   (a) memory means for having the devices of said planar graph stored therein in a representative form;
   (b) programming means interconnected with said memory means for entering said devices of said planar graph into said memory means in said representative form, comprising:
      (i) first entry means usable for establishing in said memory means a condition precedent for representing a left node-to-left node interconnection between a subject device and a yet unentered device;
      (ii) second entry means usable for establishing in said memory means a condition precedent for representing a right node-to-right node interconnection between a subject device and a yet unentered device, and usable for representing in said memory means the interconnection of the left node of the next entered device with the left node of a previously entered device for which a condition precedent for representing a left node-to-left node interconnection had been previously established in said memory means;
      (iii) third entry means usable for representing in said memory means the interconnection of the right node of a subject device with the right node of a previously entered device for which a condition precedent for representing a right node to-right node interconnection had been previously established; and
   (c) planar graph solving means interconnected with said memory means for utilizing said planar graph as stored in said memory means for solving said ladder planar graph and for providing an output related to the solution.

31. A programmable controller for solving a non-planar graph diagram, comprising:
   (a) memory means for having the devices of said non-planar graph diagram stored therein in a representative form;
   (b) programming means interconnected with said memory means for entering said devices of said non-planar graph diagram into said memory means in said representative form, comprising:
      (i) first entry means usable for establishing in said memory means a condition precedent for representing a left node-to-left node interconnection between a subject device and a yet unentered device;
      (ii) second entry means usable for establishing in said memory means a condition precedent for representing a right node-to-right node interconnection between a subject device and a yet unentered device, and usable for representing in said memory means the interconnection of the left node of the next entered device with the left node of a previously entered device for which a condition precedent for representing a left node-to-left node interconnection had been previously established in said memory means;
      (iii) third entry means usable for representing in said memory means the interconnection of the right node of a subject device with the right node of a previously entered device for which a condition precedent for representing a right node to-right node interconnection had been previously established; and
   (c) non-planar graph solving means interconnected with said memory means for utilizing said non-planar graph as stored in said memory means for solving said non-planar graph and for providing an output related to the solution.

32. A programmable controller for solving a ladder diagram, comprising:
   (a) memory means for having a multiple input device of said ladder diagram stored therein in a representative form;
   (b) programming means interconnected with said memory means for entering said multiple input device of said ladder diagram into said memory means in said representative form, comprising:
      (i) first entry means usable for establishing in said memory means a condition precedent for representing a left node-to-left node interconnection between a subject device and a yet unentered device;
      (ii) second entry means usable for establishing in said memory means a condition precedent for representing a right node-to-right node interconnection between a subject device and a yet unentered device, and usable for representing in said memory means the interconnection of the left node of the next entered device with the left node of a previously entered device for which a condition precedent for representing a left node-to-left node interconnection had been previously established in said memory means;
      (iii) third entry means usable for representing in said memory means the interconnection of the right node of a subject device with the right node of a previously entered device for which a condition precedent for representing a right node to-right node interconnection had been previously established; and (c) ladder diagram solving means interconnected with said memory means for utilizing said ladder diagram as stored in said memory means for solving said ladder diagram and for providing an output related to the solution.

33. The combination as claimed in claim 32 wherein said multiple input device comprises a counter.

34. The combination as claimed in claim 32 wherein said multiple input device comprises a timer.

35. A programmable controller for solving a ladder diagram, comprising:
  (a) memory means for having a multiple output device of said ladder diagram stored therein in a representative form;
  (b) programming means interconnected with said memory means for entering said multiple output device of said ladder diagram into said memory means in said representative form, comprising:
    (i) first entry means usable for establishing in said memory means a condition precedent for representing a left node-to-left node interconnection between a subject device and a yet unentered device;
    (ii) second entry means usable for establishing in said memory means a condition precedent for representing a right node-to-right node interconnection between a subject device and a yet unentered device, and usable for representing in said memory means the interconnection of the left node of the next entered device with the left node of a previously entered device for which a condition precedent for representing a left node-to-left node interconnection had been previously established in said memory means;
    (iii) third entry means usable for representing in said memory means the interconnection of the right node of a subject device with the right node of a previously entered device for which a condition precedent for representing a right node to-right node interconnection had been previously established; and
  (c) ladder diagram solving means interconnected with said memory means for utilizing said ladder diagram as stored in said memory means for solving said ladder diagram and for providing an output related to the solution.

36. The combination as claimed in claim 35 wherein said multiple output device comprises a timer.

37. The combination as claimed in claim 35 wherein said multiple output device comprises a counter.

38. Apparatus for solving a planar graph of interconnected devices having left and right nodes, comprising:
  (a) status generating means for generating the status of said left nodes, said right nodes and said devices, a final solution of said planar graph being ultimately provided as an output of said status generating means, interim solutions of portions of said planar graph also being provided at an output of said status generating means prior to said ultimate solution; and
  (b) left node storage means interconnected at the input thereof with an output of said status generating means for having the interim status of a left node placed therein for storage and subsequent use as a function of the presence of an OPEN attribute and for having the status of a previously stored left node removed therefrom as a function of the presence of a RETURN attribute for application to the input of said status generating means for effecting the operation of said status generating means.

39. Apparatus for solving a planar graph of interconnected devices having left and right nodes, comprising:
  (a) status generating means for generating the status of said left nodes, said right nodes and said devices, a final solution of said planar graph being ultimately provided as an output of said status generating means, interim solutions of portions of said planar graph also being provided at an output of said status generating means prior to said ultimate solution; and
  (b) right node storage means interconnected at the input thereof with an output of said status generating means for having the interim status of a right node placed therein for storage as a function of the presence of a RETURN attribute and for having the status of a previously stored node removed therefrom as a function of the presence of an UP attribute for application to the input of said status generating means.

40. The combination as claimed in claim 39 including means for determining whether the status of said previously stored node which had been removed from said right node storage means or the last right node interim solution from said status generating means is of a predetermined value and for providing an output signal related to said predetermined value, said latter output signal being fed back to an input of said right node storage means for being stored therein as a function of the concurrent presence of both said UP attribute and said RETURN attribute.

41. A programmable controller for solving a ladder diagram, comprising:
  (a) memory means for having the contacts of said ladder diagram stored therein in a representative form;
  (b) programming means interconnected with said memory means for entering said contacts of said ladder diagram into said memory means in said representative form, comprising entry means usable for establishing in said memory means a condition precedent for representing a left node-to-left node interconnection between a subject contact and a yet unentered contact; and
  (c) ladder diagram solving means interconnected with said memory means for utilizing said ladder diagram as stored in said memory means for solving said ladder diagram and for providing an output related to the solution.

42. A programmable controller for solving a ladder diagram, comprising:
  (a) memory means for having the contacts of said ladder diagram stored therein in a representative form;
  (b) programming means interconnected with said memory means for entering said contacts of said ladder diagram into said memory means in said representative form, comprising: entry means usable for establishing in said memory means a condition precedent for representing a right node-to-right node interconnection between a subject contact and a yet unentered contact, and usable for representing in said memory means the interconnection of the left node of the next entered contact with the left node of a previously entered contact; and (c) ladder diagram solving means interconnected with said memory means for utilizing said ladder diagram as stored in said memory means for solving said ladder diagram and for providing an output related to the solution.

43. A programmable controller for solving a ladder diagram, comprising:

(a) memory means for having the contacts of said ladder diagram stored therein in a representative form;

(b) programming means interconnected with said memory means for entering said contacts of said ladder diagram into said memory means in said representative form, comprising: entry means usable for representing in said memory means the interconnection of the right node of a subject contact with the right node of a previously entered contact; and (c) ladder diagram solving means interconnected with said memory means for utilizing said ladder diagram as stored in said memory means for solving said ladder diagram and for providing an output related to the solution.

* * * * *